United States Patent [19]

McMahon

[11] Patent Number: 4,742,576
[45] Date of Patent: May 3, 1988

[54] OPTICAL COMMUNICATION SYSTEM EMPLOYING COHERENT DETECTION AND METHOD

[75] Inventor: Donald H. McMahon, Carlisle, Mass.

[73] Assignee: Polaroid Corporation, Cambridge, Mass.

[21] Appl. No.: 815,073

[22] Filed: Dec. 23, 1985

[51] Int. Cl.$^4$ .............................................. H04B 9/00
[52] U.S. Cl. ........................................ 455/617; 370/3; 455/607; 455/610; 455/612
[58] Field of Search ............... 455/607, 612, 610, 617; 370/1, 3; 350/96, 16

[56] References Cited

U.S. PATENT DOCUMENTS

| | | | |
|---|---|---|---|
| 3,970,838 | 7/1976 | Goodwin et al. | 250/199 |
| 3,979,686 | 9/1976 | Abrams et al. | 329/110 |
| 3,986,020 | 10/1976 | Kogelnik | 370/3 |
| 4,031,327 | 6/1977 | Butin et al. | 370/57 |
| 4,063,084 | 12/1977 | Goodwin et al. | 250/199 |
| 4,089,584 | 5/1978 | Polczynski | 350/96.16 |
| 4,317,614 | 3/1982 | Palmer | 350/96.16 |
| 4,326,298 | 4/1982 | Fromm et al. | 455/607 |
| 4,330,084 | 7/1985 | Strebel et al. | 370/3 |
| 4,330,869 | 5/1982 | Robieux | 455/607 |
| 4,503,388 | 3/1985 | Zehl et al. | 324/77 K |
| 4,592,043 | 5/1986 | Williams | 370/3 |

*Primary Examiner*—Robert L. Griffin
*Assistant Examiner*—Leslie Van Beek
*Attorney, Agent, or Firm*—Francis J. Caufield

[57] ABSTRACT

An optical communications system for providing wavelength division multiplexed communications with high spectral channel density and increased sensitivity and selectivity through coherent detection utilizes a fixed frequency source for introducing at least one fixed frequency carrier for system-wide propagation through a system bus. Terminal devices coupled to the system bus functioning as transmitters remove a portion of the system-wide carrier energy and effect a frequency translation and modulation of the translated carrier energy for return to the system bus as a modulated, frequency shifted information bearing signal. Terminal devices functioning as a receiver effect either synchronous homodyne or heterodyne coherent detection by removing a portion of the system-wide carrier energy, optionally effecting a frequency translation, and combining the frequency shifted carrier energy with that of the frequency shifted information bearing signal to effect coherent detection. Where the relative frequency translation of information bearing signal and the locally shifted demodulating carrier energy are the same, homodyne detection is achieved, and, where the relative frequency shift of the information bearing signal and the locally shifted carrier energy is different, an intermediate frequency is provided for subsequent processing.

43 Claims, 13 Drawing Sheets

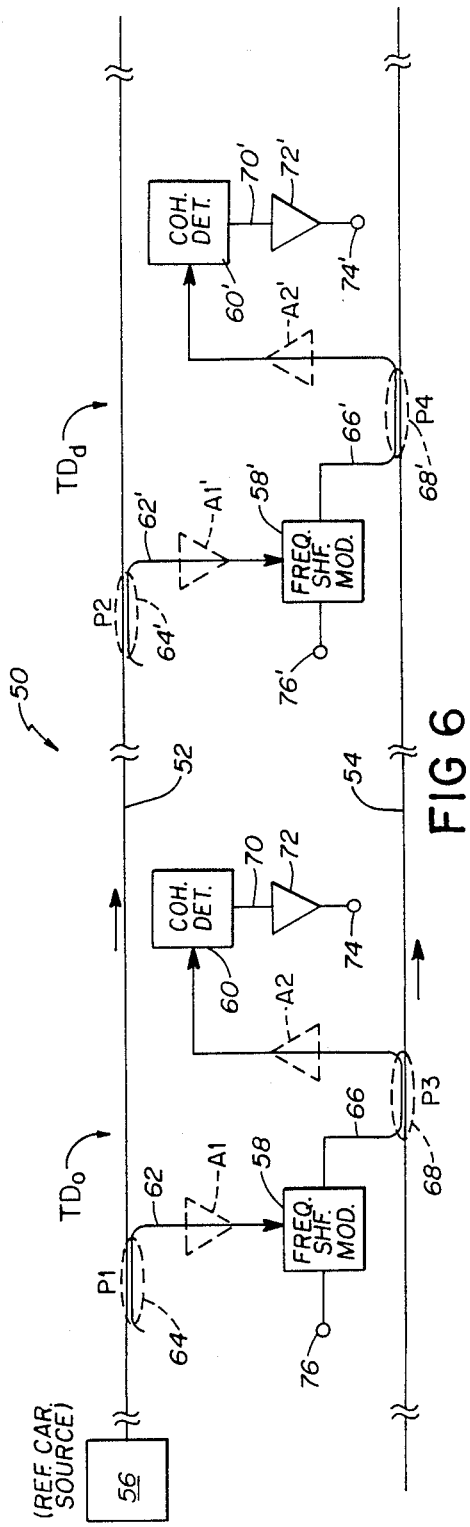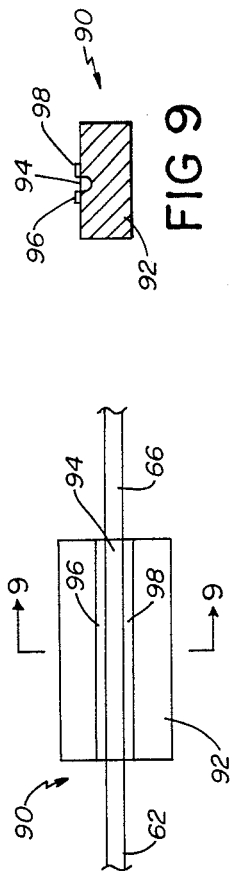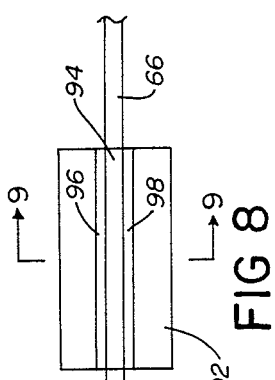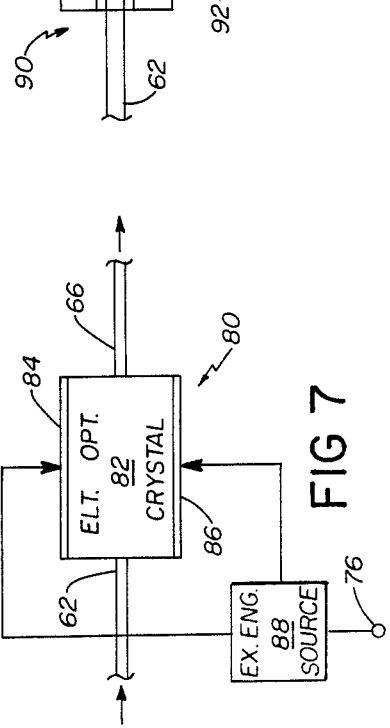

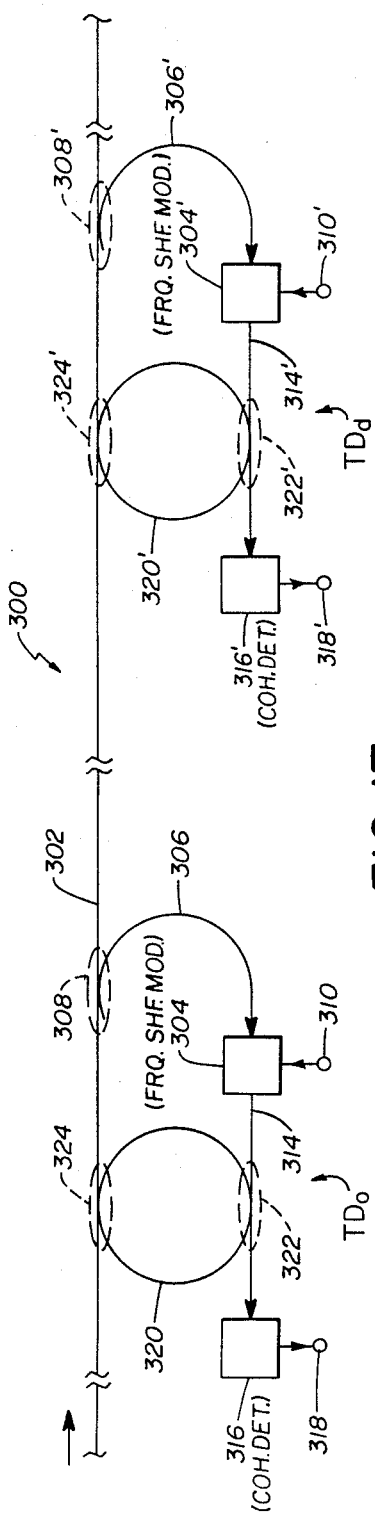
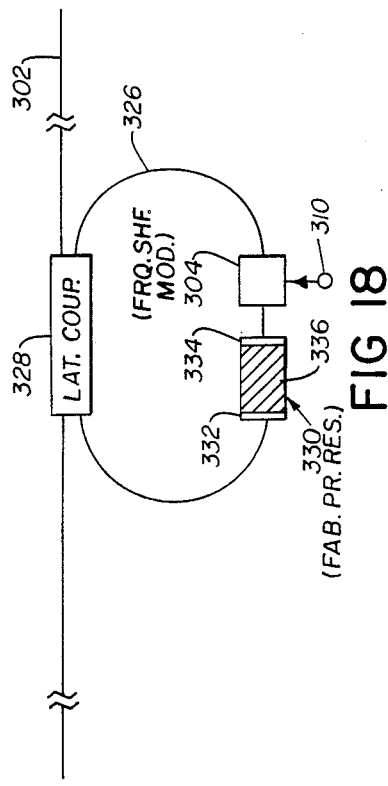
FIG 17
FIG 18

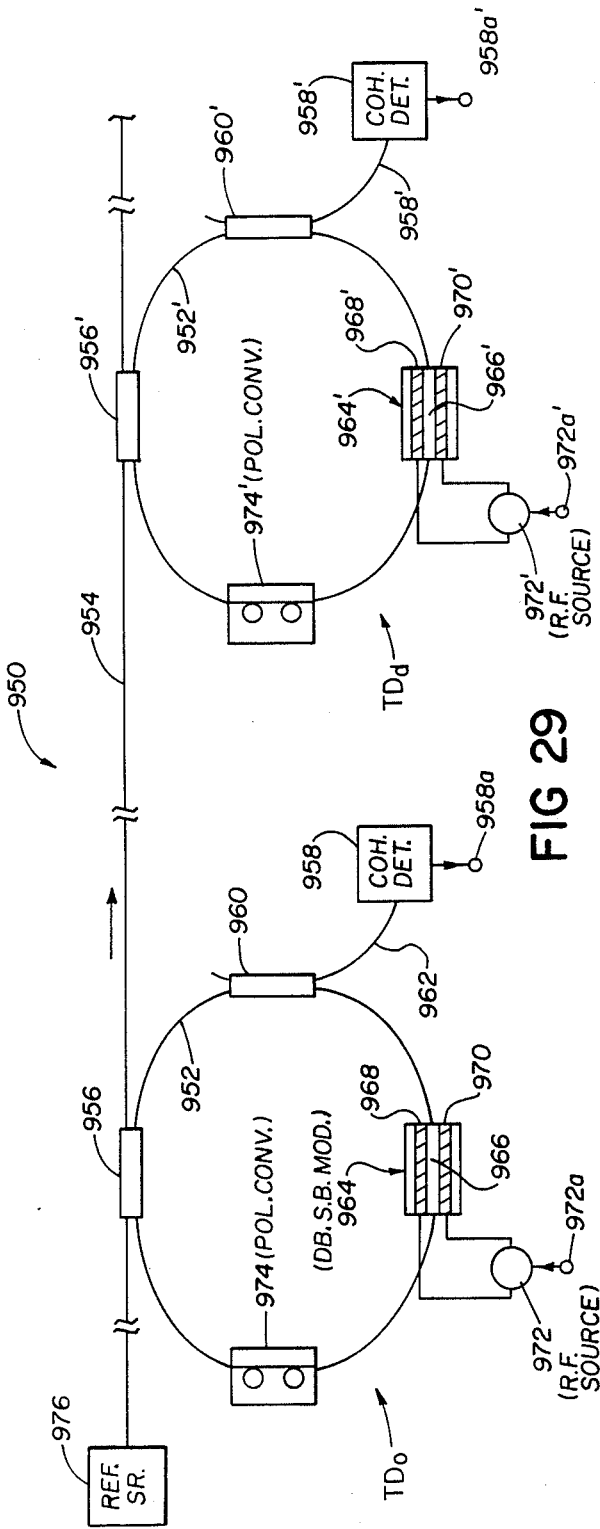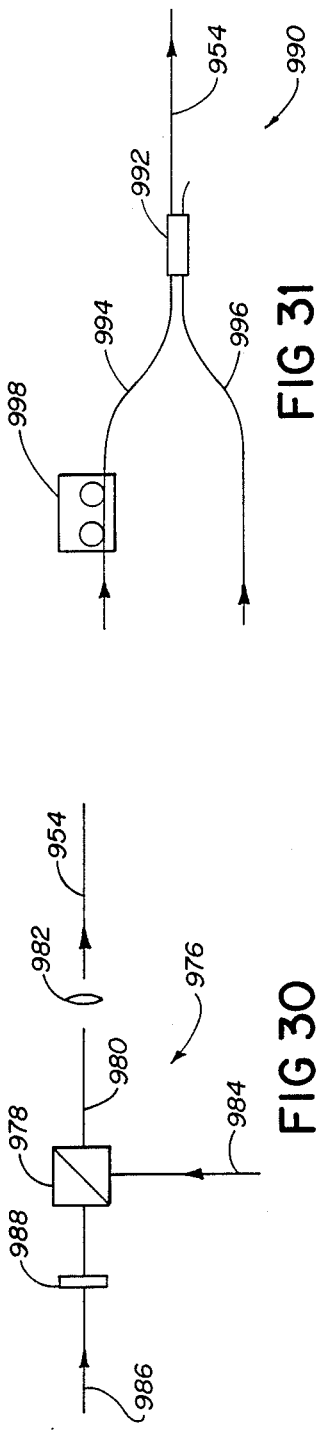
FIG 29
FIG 30
FIG 31

OPTICAL COMMUNICATION SYSTEM EMPLOYING COHERENT DETECTION AND METHOD

BACKGROUND OF THE PRESENT INVENTION

The present invention relates to optical communications systems. More particularly, it concerns optical communications systems for high density communications between a plurality of terminal devices.

In optical fiber communications systems, it is known to transmit information using both digital and analog techniques. In digital systems, an optical source, such as a light emitting diode or a laser diode, is directly modulated by a base band signal drive current with the pulsed optical output launched onto an optical path for propagation to a photodetector, such as a PIN diode or an avalanche photodiode (APD), which directly demodulates the optical energy to provide a recovered base band signal output. In such systems, the bandwidth is limited by the bandwidth of the optical source and the photodetector, as well as the optical communications path. In analog systems, the output of a carrier source can be modulated in a time varying manner and propagated to a photodetector for demodulation. In the simplest arrangement, the optical carrier can be subjected to envelope modulation and directly demodulated in a nonlinear photodetector. In more sophisticated arrangements, such as those involving wavelength or phase modulation, more sophisticated modulating and demodulating devices are required to recover the information content.

In the radio frequency portion of the electromagnetic spectrum, it is common to modulate a source carrier with information for propagation to a receiving device. Demodulation of a received signal can be effected by providing a local oscillator at the receiving device which generates a local oscillator signal which is mixed with the received signal. The local oscillator output can be offset in frequency from that of the received signal to produce a heterodyned intermediate frequency which can be subsequently demodulated or a local oscillator signal which is frequency and phase matched with the received signal to effect synchronous homodyne detection. Regardless of the type of detection utilized, the local oscillator source at the receiving device must be stable and accurately tunable.

While accurate, tunable, and highly stable local oscillator sources are readily available in the radio frequency spectrum, there are presently no corresponding sources available in the optical portion of the electromagnetic spectrum. For example, gas lasers represent a class of potential local oscillator sources because of their inherent stability and accuracy. However, gas lasers are not readily tunable and their unique power supply requirements, physical size, and cost make them unsuitable for use as local oscillators in terminal devices in a large communication system. In contrast to gas lasers, laser diodes can be wavelength controlled by varying their drive current. However, their output is not necessarily wavelength stable and is subject to long term frequency drift as a function of operating current, temperature, and to some extent, operating life. In addition, the output frequency of laser diodes is subject to short term variations as a result of optical feedback and longitudinal mode jumping in the resonant cavity such that the frequency spectra at the output varies with time about an average value. In the absence of large frequency shifts caused by mode hopping, the remanent short term "jitter" is typically 10–100 MHz and is a function of changes in the population inversion level, the index of refraction, and temperature. This short term jitter limits the channel density in wavelength multiplexed systems since channel bandwidth for filtering or coherent detection can not be narrower than the spectral frequency distribution of the laser diode output, otherwise power is lost to the detection system.

Accordingly, present efforts to develop optical communication systems which utilize a local optical source at the terminal devices, to either assist in the generation of a modulated carrier for launching onto an optical pathway or for detection purposes, is limited by presently available devices.

SUMMARY OF THE INVENTION

In view of the above, the present invention provides for an optical communication system and method which allows high density wavelength division multiplexed communications of modulated carriers on an optical bus without the use of a local oscillator at the terminal devices and yet provides optical energy generated by each terminal device that can be used for the development of a modulated carrier for transmission to other terminal devices on the optical bus or for coherent detection of received modulated carriers including detection by both homodyne and heterodyne techniques.

In one form of the invention, the communications system is defined by an optical pathway, such as an optical fiber bus, in which terminal devices are coupled to the bus for communications with one another. A system wide reference carrier source is coupled to the bus for introducing at least one highly stable system wide carrier for propagation throughout the system. Terminal devices within the system can communicate by removing a portion of the system wide reference carrier, effecting a frequency shift to a communications frequency, and modulating the frequency shifted carrier for introduction onto the system bus as an information signal for propagation to other terminal devices in the system. The terminal devices within the system, in order to receive a information signal from another terminal device, remove a portion of the information signal from the bus as well as a portion of the reference carrier transmitted by the system wide reference carrier source. To effect heterodyne detection, the removed carrier energy is frequency shifted in the receiving terminal device to a frequency offset from that of the received information signal to generate a heterodyned intermediate frequency substantially equal to the difference in frequency between the received information signal and the locally frequency shifted reference carrier. Alternatively, the removed carrier energy is not shifted in frequency so that heterodyning with the received information signal generates an "intermediate frequency" which is equal to the displacement in frequency of the information signal from the reference carrier. The resultant intermediate frequency signal can then be processed and demodulated, for example, in a conventional RF receiver. To effect homodyne detection, the removed system wide reference carrier is frequency shifted in the receiving terminal device to a frequency substantially equal to that of the received information signal to generate a homodyned base band output.

In a preferred embodiment, the optical system includes an optical pathway defined by a first optical fiber bus for carrying at least one reference carrier and a separate optical fiber bus for carrying information signals. The terminal devices are coupled between the reference carrier and information signal buses and include a controllable frequency shifting modulator coupled between the reference carrier and information signal buses and a detector coupled between both the frequency shift modulator and the information signal bus.

The frequency shift modulator, otherwise known as an optical single sideband modulator, which may take the form of an integrated optic, bulk optic, or acousto-optic device, receives a portion of the reference carrier energy from the reference carrier bus and translates and modulates the frequency of the removed reference carrier energy to a communications frequency in response to modulated RF excitation to provide an information signal or, alternatively, translates the frequency of the removed reference carrier energy to a frequency usable by the detector to directly demodulate an information signal by homodyne detection to provide a recovered information output or to provide a heterodyned intermediate frequency. An information signal provided by the frequency shift modulator can be in the form of a double sideband signal or, if preferred, band pass filtering can be provided to suppress one sideband and the carrier to provide a single sideband information signal.

The reference carrier and information signal buses are desirably fabricated in a single cable and terminal devices are likewise constructed with identical architectures so that the propagation path length and signal propagation times for the reference carrier and information signals are substantially equal from the reference carrier source position to a destination terminal device to minimize adverse affects caused by short term frequency jitter of the system wide carrier source. The equalization of the propagation path lengths and propagation times effectively narrows the frequency distribution spectrum of the coherently detected signal to allow increased channel density of small bandwidth signals.

In addition to using respective optical fiber buses for the system wide reference carrier energy and the information signals, a single optical fiber core can be used to propagate both the system wide reference carrier and the information signal.

In each of the embodiments, a plurality of frequency spaced reference carriers may be provided on the reference carrier bus with the various terminal devices including resonant structures for tuning to one of the available reference carriers to thus define a plurality of frequency distinct bands to provide a large number of available communication channels. A single reference carrier can be used to provide energy for both information signal generation and coherent detection or a reference carrier can be used to provide energy for information signal generation and a second reference carrier can be used to provide energy for coherent detection. Additionally, reference carriers can be provided in different polarization states for use by terminal devices for information signal generation and coherent detection.

A principal objective of the present invention is, therefore, the provision of an improved optical fiber communications system and method in which at least one system wide carrier reference is propagated throughout the system for use by the various terminal devices in providing a modulated information signal or in providing a reference carrier for effecting coherent demodulation in each of the terminal devices. Other objects and further scope of applicability of the present invention will become apparent from the detailed description to follow, taken in conjunction with the accompanying drawings, in which like parts are designated by like reference characters.

BRIEF DESCRIPTION OF THE DRAWINGS

FIG. 6 is a schematic representation of a portion of an open bus optical communications system in accordance with the present invention employing the optical pathway of FIG. 3;

FIG. 7 is a schematic representation of a first embodiment of a double sideband frequency shift modulator;

FIG. 8 is a schematic representation of a second embodiment of a double sideband frequency shift modulator;

FIG. 9 is a cross sectional view of the frequency shift modulator of FIG. 8 taken along line 9—9 of FIG. 8;

FIG. 17 is an illustration of a terminal device for use with a combined reference carrier and information signal bus system of the type illustrated in FIGS. 16 and 17 and utilizing sinle sideband signal transmission;

FIG. 18 is a schematic illustration of a variation of the terminal structure illustrated in FIG. 17;

FIG. 29 is a schematic illustration of a communications system utilizing oppositely polarized light for transmitting information;

FIG. 30 is a schematic illustration of an apparatus for providing oppositely polarized light to the system of FIG. 28; and FIG. 31 is a schematic illustration of another apparatus for providing oppositely polarized light.

DESCRIPTION OF THE PREFERRED EMBODIMENT

Figure 1:
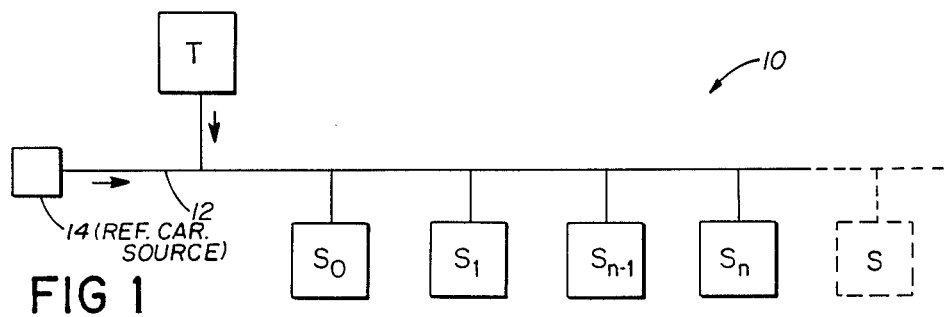
FIG. 1 is a schematic representation of a unidirectional open bus communications system in accordance with the present invention.
Figure 2:
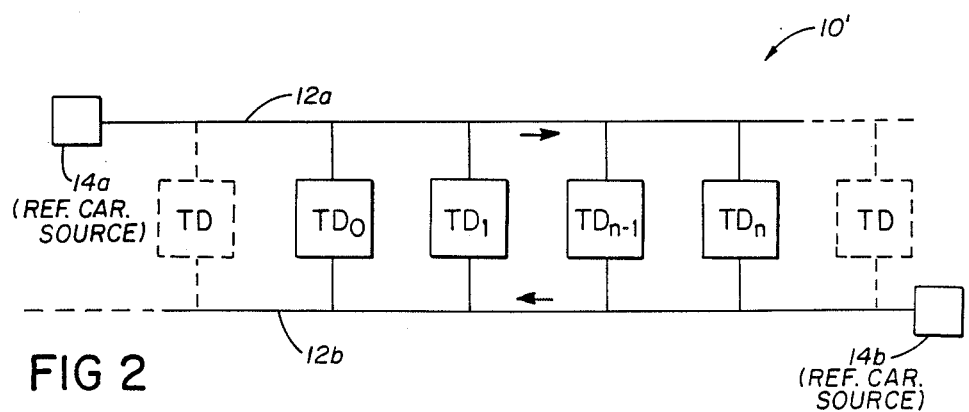
FIG. 2 is a schematic representation, similar to that of FIG. 1, of a bidirectional open bus communications system in accordance with the present invention.

The optical communications system of the present invention can be used in a number of network topologies including the open bus arrangements of FIGS. 1 and 2. In FIG. 1, the optical communications system, designated by the reference character 10, is defined by an optical pathway 12 with a reference carrier source 14 coupled to the optical pathway 12 for introducing one or more fixed frequency reference carriers onto the pathway 12 for propagation from the left to the right. A signal transmission source T and a plurality of subscribers $S_0, S_1, \ldots, S_{n-1}, S_n$ are coupled to the optical pathway 12 with a portion of the optical pathway 12 and one of the subscribers shown in dotted line representation to indicate that a potentially large number of subscribers can be coupled to the optical pathway 12. The topology of the optical communications system 10 of FIG. 1 is well suited to subscriber distribution systems for distributing information signals from the transmitting source T to a large number of receive only subscribers $S_n$. The information signals can include, for example, commercial television, radio, video text, computer data, etc., signals typically used by subscribers in a commercial distribution network.

While the system 10 of FIG. 1 is well suited for unidirectional signal propagation, a duplex optical communications system, as represented in FIG. 2 and designated generally by the reference character 10', can be provided in which each user has both a transmit and a receive capability to effect bidirectional communications. In FIG. 2, first and second optical pathways 12a and 12b are provided with a reference carrier source 14a and 14b provided, respectively, for the optical pathways 12a and 12b. A plurality of terminal devices $TD_0$, $TD_1, TD_2, \ldots TD_{n-1}, T_n$ are coupled between the pathways 12a and 12b for transmitting signals in a first direction using the optical pathway 12a or receiving signals in a second direction using the optical pathway 12b.

Figure 3:
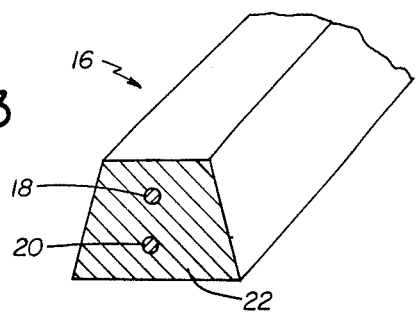
FIG. 3 is a partial perspective view of a dual bus optical fiber pathway suitable for use in the network configurations of FIGS. 1 and 2.

The optical pathway of the exemplary systems illustrated in FIGS. 1 and 2 is defined by at least one optical fiber having a light guiding core and, more preferably, by an optical fiber, as illustrated in FIG. 3, having a plurality of cores. As shown in FIG. 3, a preferred optical fiber 16 has first and second light guiding cores 18 and 20 surrounded by a cladding material 22 having an index of refraction less than that of the cores 18 and 20 to permit guided light propagation in each core. The cores 18 and 20 are sufficently separated to minimize evanescent field coupling between the cores and potential cross modulation of the system reference carrier or carriers and transmitted information signals. The optical fiber 16 is preferably provided with an asymmetric transverse cross section, such as the trapezoidal cross section of FIG. 3, to aid in distinguishing one core from the other and may have flat surfaces adjacent each core to facilitate lateral coupling.

Figure 4:
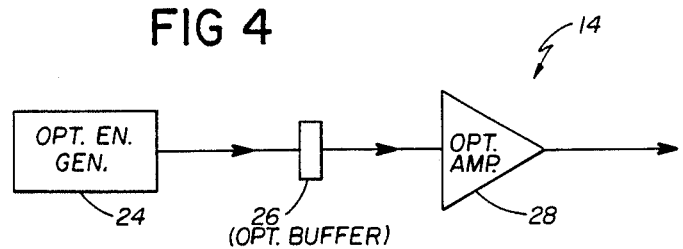
FIG. 4 is a schematic representation of a reference carrier source for propagating a reference carrier throughout the communications system.

Each of the optical communication systems of FIGS. 1 and 2 uses a system wide reference carrier source 14 for directing optical energy into the optical pathway. A representative optical source 14 is illustrated in schematic form in FIG. 4. As shown, an optical energy generator 24 directs its light output through an optical buffer 26 to an optional optical amplifier 28. In its most basic form, the optical generator 24 may take the form of a gas laser or a semiconductor laser diode operating in the desired portion of the optical spectrum, typically between 0.8 and 1.6 microns. The optical buffer 26 serves to attenuate optical feedback into the optical energy generator to minimize frequency disturbing stimuli and may take the form of a neutral density filter, a magnetic isolator, or an acousto-optic modulator operating as an isolator. The optical amplifier 28, when used, effects a power gain in the optical energy after it passes through the optical buffer 26, the gain increase sufficient to meet the power needs of the optical communications system. A suitable optical source employing a semiconductor laser slaved to the output of an inherently stable gas laser is disclosed in applicant's commonly assigned U.S. patent application Ser. No. 783,436, filed Oct. 3, 1985, and entitled "OPTICAL COMMUNICATIONS SYSTEM EMPLOYING FREQUENCY REFERENCE", and an optical amplifier suitable for increasing the power level of the optical energy is disclosed in commonly assigned U.S. patent application Ser. No. 729,647, filed Apr. 30, 1985, and entitled "ADSCITITOUS RESONATOR", the disclosures of which are incorporated herein to the extent necessary to practice the present invention.

Figure 5:
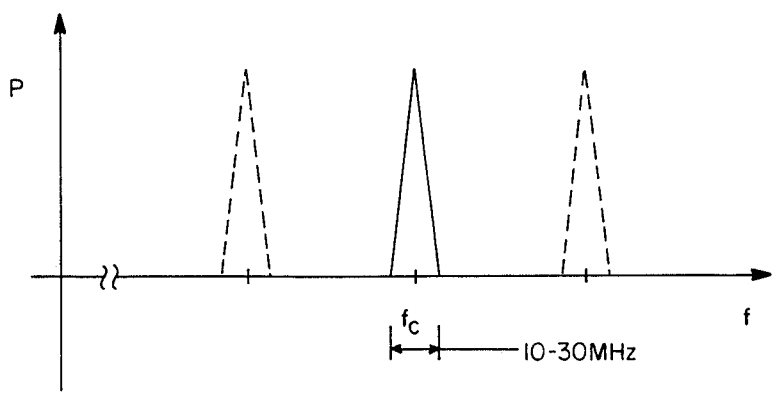
FIG. 5 is a idealized graphical representation of the spectral distribution of the reference carrier source of FIG. 4 with the vertical axis representing power and the horizontal axis representing frequency.

Regardless of the type of optical energy generator 24 used, it is preferred that the output, as graphically represented in FIG. 5, have a relatively narrow spectral width or distribution with minimum short term and long term frequency drift. Long term frequency drift can be controlled by effective control of the drive power and operating temperature as well as environmental and other parameters. Short term drift, or jitter, is caused, for example, by variations in the index of refraction of the laser medium or the laser resonant cavity which, over a short observation period, presents a typically 10–30 MHz spectral distribution. As explained in more detail below, the present invention provides an effective line width narrowing during coherent detection that minimizes problems associated with short term jitter and allows an increased number of information signals to be propagated in a given restricted bandwidth of the optical pathway. As illustrated by the dotted line portion of FIG. 5, the reference carrier source 14, as described below, can be used to provide a plurality of fixed frequency spaced reference carriers.

In the embodiments described below, one or more fixed frequency spaced reference carriers are propagated with one or more frequency-specific information signals on either respective reference carrier and information signal buses (a double bus system) or on a common communications bus (a single bus system) which conveys both reference carrier and information signals. As explained in more detail below, the information signals can be propagated as double sideband (DSB) signals, where both upper and lower sidebands each carry the full information content, or propagated as single sideband signals. Where double sideband signals are propagated, either on a double bus or single bus system, it is desirable, as pointed out below, to maintain the phase relationship between the two sidebands and the reference carrier energy to avoid fading or nulls in the detection of the information signal, such fading or nulls occurring as a result of varying phase relationships. To this end, phase-locking feedback control may be provided at the transmitter location in a double sideband, single bus system and at the receiver location in a double sideband, double bus system. The phase relationship can be controlled, for example, by thermally controlling the effective optical length of an optical path at the transmitter location in the double sideband, single bus system or at the receiver location in the double sideband, double sideband system. In general, it is desirable that the total power of the reference carrier or of each carrier be relatively high compared to that of the individual transmitted information signals so that relatively efficient coherent detection can be accomplished with the relatively strong reference carrier and any one information signal and to minimize information signal to information signal cross talk.

An exemplary unidirectional system in accordance with the present invention is illustrated in FIG. 6 and designated generally therein by the reference character 50. The system 50 includes an optical pathway having a reference carrier bus 52 defined by a first optical energy guiding core and an information signal bus 54 defined second optical energy guiding core, both cores preferably fabricated in a single fiber as presented in FIG. 3 and as discussed above. The optical pathway is arranged as an open bus system of extended length with terminal devices $TD_n$ connected to the optical pathway including, as illustrated on the left in FIG. 6, an originating terminal device $TD_o$ and, as illustrated on the right, a destination terminal device $TD_d$. In FIG. 6 and subsequently herein, like components of the originating and destination terminal devices are designated by the same reference character with the reference characters of the destination terminal device additionally designated by the prime (') symbol. The reference carrier bus 52 is designed to accept a system wide reference carrier from the system wide reference carrier source 56, described above in relationship to FIG. 4, and convey the reference carrier to the various terminal devices $TD_n$ in the system 50. The information signal bus 54 functions to carry information signals from various originating terminal devices $TD_o$ to destination terminal devices $TD_d$. In order to provide bidirectional or duplex communications capacity, a second optical pathway (not shown) can be provided in accordance with the topology of FIG. 2 for conveying system wide reference carrier and information signals in a direction opposite from that illustrated in FIG. 6.

The various terminal devices $TD_n$ are identically configured and include a frequency shift modulator 58 and a coherent detector 60. A coupling link 62 is laterally coupled to the reference carrier bus 52 through a lateral coupling 64 and serves to remove a portion of the reference carrier energy through the lateral coupling 64 from the reference carrier bus 52 and present the energy to the frequency shift modulator 58. Another optical coupling link 66 is coupled from the output of the frequency shift modulator 58 through another lateral coupling 68 to the information signal bus 54 and to the input of the coherent detector 60. The output of the coherent detector 60, which can represent either a base band information signal or an intermediate frequency information signal, is presented through a connection path 70 to an amplifier 72 and then to a signal output terminal 74.

The frequency shift modulator 58 includes an excitation input 76 for accepting a modulated RF carrier signal that is effective to excite the modulator 58. The frequency shift modulator 58 can take one of several forms including a bulk optic device as shown in FIG. 7 and an integrated optic device as shown in FIGS. 8 and 9.

As shown in FIG. 7, a bulk optic modulator 80 is defined by an appropriately aligned electro-optic crystal 82, for example, lithium niobate (LiNbO$_3$), having electrodes 84 and 86 formed on opposite side faces. Light is introduced into the electro-optic crystal 82 from the optical coupling link 62 and passes through the electro-optical crystal 82 into the optical coupling link 66 for transfer through the lateral coupling 68 into the information signal bus 54 or to the coherent detector 60. The electrodes 84 and 86 are coupled to an excitation energy source 88, which accepts the radio frequency carrier at input 76 and provides the modulated RF carrier signal to the electro-optic modulator 80. The modulator 80 may be operated to effect a frequency shift of the reference carrier to another frequency as well as effect a frequency shift and modulation of the shifted signal in accordance with the modulated RF carrier provided to the input 76. The electro-optical crystal 82 responds to the excitation signal from the excitation energy source 88 to effect a frequency shift of the optical energy by the amount of the RF carrier frequency prior to its introduction into the optical coupling link 66.

As shown in FIGS. 8 and 9, an integrated optic modulator, generally designated by the reference character 90, includes a substrate 92, such as lithium niobate, in which a light guiding channel 94 (FIG. 9) is formed. The light guiding channel 94 may be formed by doping appropriate areas of the substrate 92 with an index of refraction altering material, such as titanium. Electrodes 96 and 98 are formed, for example, by electro-deposition, on opposite lateral edges of the light guiding channel 94. Optical energy from the optical coupling link 62 is launched into the light guiding channel 94 and presented to the optical coupling link 66 for transfer to the information signal bus 54 through the lateral coupling 68 or for presentation to the coherent detector 60. The operation of the integrated optic modulator of FIGS. 8 and 9 is analagous to that of the bulk optic modulator 80 of FIG. 7 in that a modulated RF carrier is applied to the electrodes 96 and 98 to effect a frequency shift from the reference carrier frequency to a shifted frequency. The modulators of FIGS. 7-9 are of the type that produce double sidebands, that is, two sidebands, each of which includes the full information content of the modulated RF carrier that excites the modulating device. In addition and as explained below, single sideband modulators may also be used and may be preferable in some applications.

Additional disclosure relating to electro-optic frequency shifting and modulation may be found in Johnson, L., Becker, R. et al. "Integrated Optical Channel-Waveguide Frequency Shifter" Lincoln Laboratory, Massachusetts Institute of Technology, Lexington, MA; Risk, W. P., Youngqist, G.S. et al., "Acousto-Optic Birefringent Fiber Frequency Shifters", Edward L. Ginzton Laboratory, Stanford University, CA; and applicant's commonly assigned U.S. patent application Ser. No. 811,775 filed 12-20-85 filed herewith and entitled "WAVELENGTH MULTIPLEXED OPTICAL COMMUNICATIONS SYSTEM AND METHOD", the disclosures of which are incorporated herein to the extent necessary to practice the present invention.

The coherent detector 60 may take the form of a conventional photodetector such as a PIN photodiode or, where greater sensitivity is required, an avalanche photodiode (APD) operated at a high reverse-bias voltage to allow avalanche multiplication to take place.

In a terminal device $TD_n$ operating to transmit an information signal, such as the originating terminal device $TD_o$ in FIG. 6, a portion of the reference carrier energy in the reference carrier bus 52 is removed through the lateral coupling 64 and transferred into the optical coupling link 62. Preferably, only a small fraction of the energy in the reference carrier bus 52 is removed, that is, only enough energy to provide the desired information signal. In this way, the optical load placed on the reference carrier bus by each originating terminal is minimized to thus maximize the reference carrier energy available to the other terminal devices in the system. Typically, a −20 dB attenuation is used in the transfer of the reference carrier energy through the lateral coupling 64 into the optical coupling link 62. Where a lower efficiency lateral coupling 64 is desired, for example, to permit more subscribers to be placed on the link, a coupling having a −40 dB attenuation and an in-line optical amplifier A1 (dotted line illustration) may be used to provide gain to the removed reference carrier energy, suitable amplifiers being disclosed in the above incorporated and commonly assigned U.S. patent application Ser. No. 729,647, filed Apr. 30, 1985, and entitled "ADSCITITOUS RESONATOR". The reference carrier energy is introduced into the frequency shift modulator 58 from the optical coupling link 62 while the frequency shift modulator 58 is excited with a modulated RF carrier applied to input 76. The frequency shift modulator 58 effects a frequency translation of the reference carrier energy to an information signal frequency that is displaced in frequency from the reference carrier by the amount of the modulated RF carrier input frequency applied to the modulator 58 to provide a double sideband signal at the translated frequencies including upper and lower sidebands. The output of the frequency shift modulator 58 is presented through the optical coupling link 66 and the lateral coupling 68 into the information signal bus 54 for propagation to other terminal devices $TD_n$ within the system. The lateral coupling 68 typically introduces a −20 dB attenuation in effecting the energy transfer.

A terminal device $TD_n$ operating to receive an information signal, such as the destination terminal device $TD_d$ shown on the right in FIG. 6, removes a portion of the reference carrier energy from the reference carrier bus 52 through the lateral coupling 64'. The destination terminal device $TD_d$, as in the case of the originating terminal device $TD_o$, removes a small fraction of reference energy in the reference carrier bus 52, that is, only enough energy to effect detection to thus maximize the energy remaining for use by the other terminal devices in the system. The removed energy is presented through the optical coupling link 62' into the frequency shift modulator 58'. For direct optical homodyne detection, the frequency shift modulator 58' is excited with RF energy applied to its input 76' at a frequency equal to that of the RF energy which excites the frequency shift modulator 58 of the originating terminal device $TD_o$ to effect a frequency translation of the reference carrier energy at the destination terminal device $TD_d$ to a translated frequency equal to that of the double sideband signal presented on the information signal bus 54 by the originating terminal device $TD_o$. The output of the frequency shift modulator 58' is presented through the optical coupling link 66' to the coherent detector 60'. Additionally, the double sideband information signal from the originating terminal device $TD_o$ is coupled from the information signal bus 54 through the lateral coupling 68' into the optical coupling link 66' and likewise presented, with the frequency translated reference carrier, to the coherent detector 60'. An in-line optical amplifier A2' (dotted line illustration) can be provided to effect a pre-detector gain increase in the optical energy presented to the coherent detector 60'. Where the frequency shifted reference carrier energy provided by the frequency shift modulator 58' of the destination terminal device $TD_d$ is equal in frequency to the frequency of the modulated RF carrier energy exciting the frequency shift modulator 58 of the originating terminal device $TD_o$, the coherent detector 60' of the destination terminal device $TD_d$ operates as a homodyne detector by effecting synchronous detection to provide an output along signal path 70' representing the recovered information content. If desired, the frequency shifted energy provided from the frequency shift modulator 58' of the destination terminal device $TD_d$ can be controlled to frequency translate the reference carrier energy to effect heterodyne detection at the coherent detector 60' to provide an output signal through the signal path 70' which represents an intermediate frequency information signal which can be subsequently processed, for example, through a RF receiver (not shown) to effect information content recovery. Finally, the frequency shift modulator 58' may be inactivated, so that the unshifted optical carrier frequency produces an equivalent RF electrical signal when the optical signal energy is coherently detected.

Coherent detection allows the information recovery of modulated signals without the use of resonant structures and with increased selectivity against other information signal frequencies and with increased signal-to-noise ratio. In order to optimally effect coherent detection, particularly homodyne detection, it is desirable that the phase relationship of the reference carrier energy from the originating terminal device $TD_o$ and that from the reference carrier energy which continues to the designation terminal device $TD_d$ be maintained. To this end, it is desirable that path length differences and consequent propagation time differences for the reference carrier and information signal energy between an originating terminal device $TD_o$ and a destination terminal device $TD_d$ be phase locked by a feedback circuit (not shown) to eliminate fading or nulls in the detection of coherent signals that could result with a quadrature phase relationship. Further and as shown in FIG. 6, the propagation path for the reference carrier energy from the originating terminal device $TD_o$ to the destination terminal device $TD_d$ extends between point P1 at the lateral coupling 64 and the point P2 at the lateral coupling 64', and the corresponding propagation path for the modulated information signal extends between the point P3 at the lateral coupling 68 and the point P4 at the lateral coupling 68'. Since the terminal devices $TD_n$ are constructed of like architecture, the propagation path length and corresponding propagation time for a portion of the reference carrier energy removed from the reference carrier bus 52 at the lateral coupling 64, frequency shifted and modulated, and passed through to the lateral coupling 68 to the information bus 54 for propagation through to the lateral coupling 68' to the coherent detector 60' will be substantially the same as for that portion of the reference carrier energy propagated past the lateral coupling 64 to the lateral coupling 64' where the energy is removed, frequency shifted, and passed along the optical coupling link 66' to the coherent detector 60' to effect sychronized coherent detection. More specifically, the propagation path between the points P1, P3, and P4 can be made to be substantially equal to the corresponding propagation path between the points P1, P2 and P4. Since the relative propagation times will be substantially equal, sychronized detection is possible even if the system wide reference carrier source 56 is subject to short term jitter since the same frequency energy will arrive from the source to the same destination point because of the equalized path lengths and propagation times. One consequence of the path length equalization and the corresponding propagation time delay equalization is an effective apparent line width narrowing upon coherent detection of the reference carrier source 56 in that both slow and fast source frequency jitter and multi-longitudinal mode emission does not affect the phase relationship of that portion of the reference carrier energy that is frequency shifted and modulated as an information signal and that corresponding portion of the reference carrier energy that is frequency shifted for homodyne or heterodyne detection to provide a system that is tolerant of source frequency variation which produces the typically observed linewidth. Thus, where the effective line width of a semiconductor laser source is between 10 and 30 MHz (FIG. 5), the effect of the path length and propagation delay time equalization in a coherent detection system is to provide an effective reduced laser line width at the reference carrier source. The following table illustrates the relationship between path length differences and effective line width as observed during coherent detection.

TABLE

| PATH DIFFERENCE (METERS) | EFFECTIVE LASER LINE WIDTH (HERTZ) |
| --- | --- |
| .01 | 1. |
| .10 | 10. |
| 1.00 | 100. |
| 10.00 | 1000. |
| 100.00 | 10000. |
| 1000.00 | 100000. |
| 10000.00 | 1000000. |

As can be appreciated from the above, substantial benefits are provided in terms of effective line width narrowing by providing equalized path length and propagation time delays for the modulated information signal, derived from the system wide reference carrier energy, and the synchronized detection signal, also derived from the same system wide reference carrier energy.

Figure 10:
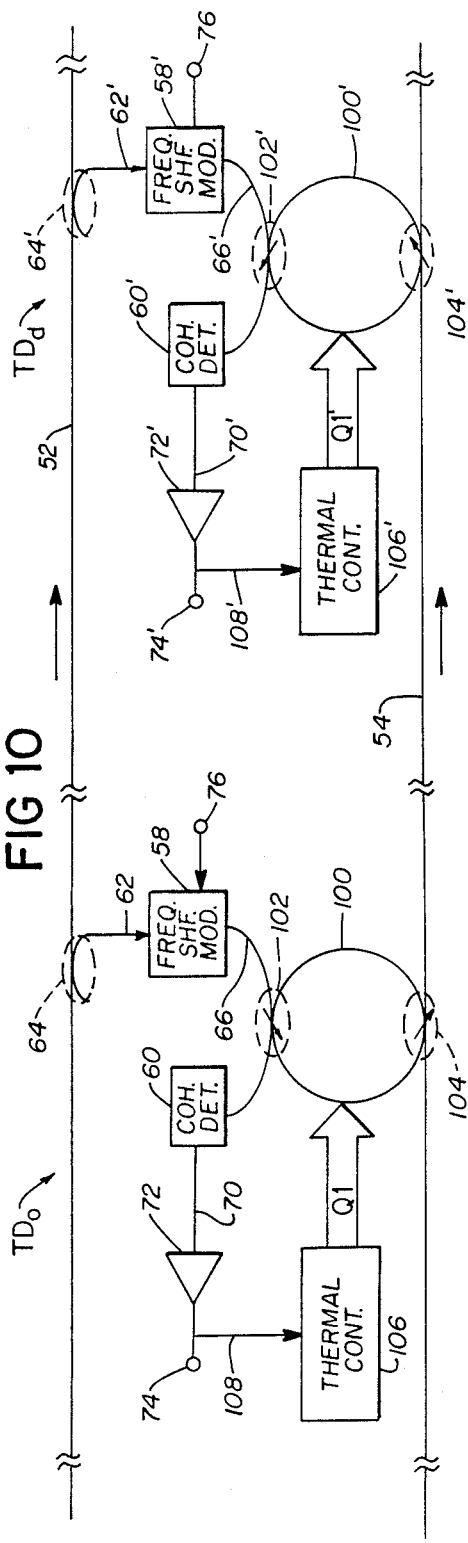
FIG. 10 is a partial schematic diagram of an optical communication system, similar to that illustrated in FIG. 6 employing single sideband communications signals.

In the system described above in relationship to FIG. 6, a portion of the system wide reference carrier energy is removed through the lateral coupling 64 and presented to the frequency shift modulator 58 for modulation in response to a modulated RF carrier input to provide a double sideband signal for presentation through the lateral coupling 68 to the information signal bus 54. Double sideband modulation results in the doubling of the bandwidth required for a given modulated RF carrier input, since each sideband contains the full information content of the original base band modulating signal. As shown in FIG. 10, a single sideband system embodiment can be provided in which only a single sideband, either the upper or lower sideband of the double sideband signal, is presented to the information signal bus 54 to thus increase spectral efficiency.

As shown in FIG. 10, single sideband terminal devices $TD_n$ are constructed in a manner similar to those described above with like reference characters designating like parts. Each single sideband terminal device $TD_n$ includes a resonant cavity in the form of a resonant loop 100 coupled between the optical coupling link 66 and the information signal bus 54 through respective lateral couplings 102 and 104 and a thermal controller 106 that receives its control input from the output 74 of the coherent detector 60 along control path 108 and thermally otherwise or controls the resonant characteristics of the resonant loop 100 by introducing greater or lesser quantities of thermal energy along a thermal transfer path Q1.

The resonant loop 100 may take the form of a discrete fiber loop or an integrated optic loop cavity formed by doping selected paths in a substrate with an index of refraction altering material to define an optic circuit resonant cavity. The resonant loop 100 will resonantly support optical energy at wavelengths that are an integer number of the effective optical length of the resonant loop. Since, as explained below, the effective optical length of the resonant loop 100 can be altered thermally so that optical energy at different sets of wavelengths will be resonantly supported, it is possible to tune the resonant loop 100 to a preferred sideband, for example, the upper or lower sideband of a double sideband information signal, to allow the resonant loop to function as a pass band filter for one of the sidebands while cutting off or at least greatly attenuating the other, undesired sideband. The thermal controller 106 receives its control input from the output 74 of the coherent detector 60 provided through the amplifier 72 which output, as described above, may provide a modulated intermediate frequency signal in the case of heterodyne detection or a base band signal in the case of homodyne detection.

In operation, an originating terminal device, such as the terminal device $TD_o$ illustrated on the left in FIG. 10, removes a portion of the system wide reference carrier energy from the reference carrier bus 52 through the lateral coupling 64 and propagates the removed energy through the optical coupling link 62 to the frequency shift modulator 58. A modulated RF carrier signal is presented through input 76 to the frequency shift modulator 58 which provides a frequency translated and modulated double sideband information signal to the optical coupling link 66. A portion of the frequency translated and modulated double sideband signal is presented to the coherent detector 60 with the major portion transferred through the lateral coupling 102 into the resonant loop 100 for transfer through the lateral coupling 104 into the information signal bus 54. The coherent detector 60 provides a signal output through amplifier 72 along control path 108 to the thermal controller 106 which alters the quantity of thermal energy provided along thermal path Q1 to the resonant loop 100 in such a way to cause the resonant loop to lock to the frequency of one of the sidebands of the double sideband signal presented through the optical coupling link 66. The resonant characteristics of the resonant loop 100 are selected so that wavelengths about and including one of the sidebands of the double sideband signal will be preferentially supported for transfer through the lateral coupling 104 into the information signal bus 54 while suppressing or greatly attenuating optical energy at wavelengths corresponding to the other sideband. In this manner, a single sideband and the remaining unaltered carrier frequency component, containing all the information content of the original information input, is transferred through the lateral coupling 104 into the information signal bus 54.

A destination terminal device, such as the terminal device $TD_d$ illustrated on the right in FIG. 10, operates to remove a portion of the reference carrier from the reference carrier bus 52 through its lateral coupling 64' and present the energy through the optical coupling link 62' to the frequency shift modulator 58' which is excited by RF energy at input 76' to translate the frequency of the reference carrier in a manner corresponding to the frequency translation produced by the frequency shift modulator 58 of the originating terminal device $TD_o$. The frequency translated carrier is provided through the optical coupling link 66' to the coherent detector 60' of the destination terminal device $TD_d$.

The resonant loop 100' of the destination terminal device $TD_d$ resonantly supports selected wavelengths of optical energy transferred from the information signal bus 54 through the lateral coupling 104' and transfers the energy through the lateral coupling 102' to the optical coupling link 66' for mixing in the coherent detector 60'. Since the resonant characteristics of the resonant loop 100' are such that only a single sideband will be passed, the coherent detector 60' of the destination terminal device $TD_d$, by virtue of the inherent selectivity achieved using coherent detection techniques, will provide an output having an amplitude that is a function of the signal strength of the received upper or lower sideband signal. The thermal controller 106', in response to the control signal provided by the coherent detector 60' through the amplifier 72' will alter the quantity of thermal energy provided along thermal path Q1' to the resonant cavity loop 100' to cause it to tune to and side lock to the sideband of the received information signal.

As can be appreciated from the above, the single sideband terminal structure presented in FIG. 10 greatly increases the spectral usage over the prior double sideband configurations of FIG. 9. In addition, for heterodyne detection where the RF frequency shift of the transmitter and receiver are different, there is no need, as in the double sideband modulator case, to provide a phase locked relationship between the two received sideband components used for coherent detection. Additional disclosure relating to the thermal control of resonant cavity loops may be found in applicant's above incorporated U.S. patent application Ser. No. 783,436.

The double sideband and single sideband systems of FIGS. 9 and 10 have an ultimate communications capacity that is dependent upon and limited by the bandwidth of the optical modulators employed. Where an optical modulator has a maximum bandwidth, for example, of 30 GHz, the bandwidth of the system is similarly limited.

Figure 11:
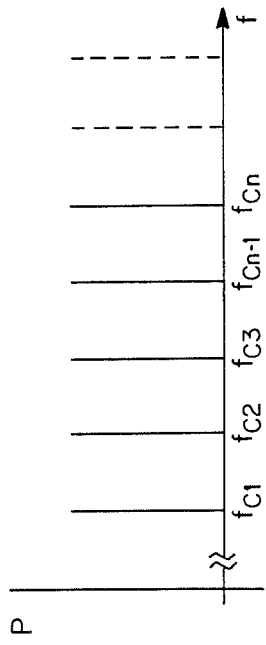
FIG. 11 is a schematic representation of the spectral output of a multireference carrier source with the vertical axis representing power and the horizontal axis representing frequency.
Figure 13:
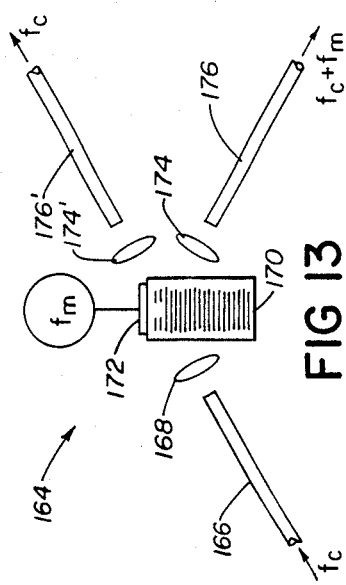
FIG. 13 is an illustration of an acousto-optic modulator for providing one of a plurality of system wide fixed frequency reference carrier signals.
Figure 12:
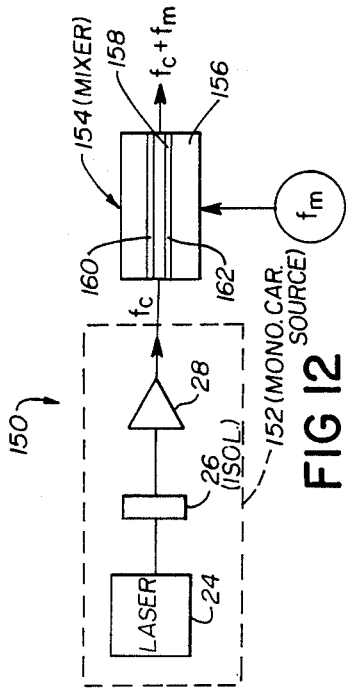
FIG. 12 is a schematic representation of a system wide reference carrier source and a modulator for providing multiple fixed frequency reference carriers as illustrated in FIG. 11.

As shown in the frequency spectra plot of FIG. 11, the system of FIG. 10 may be expanded to include adjacent bands of the optical spectrum by providing a system wide reference carrier source that produces a plurality of spectrally spaced reference carriers at frequencies $f_{C1}$, $f_{C2}$, $f_{C3}$, $f_{Cn-1}$ and $f_{Cn}$. For example, a plurality of laser sources having different output frequencies may be used or the different longitudinal modes of a mode-locked semiconductor laser may be used as the plural system wide reference carriers. A multi-carrier reference source can be configured, for example, as shown in FIGS. 12 and 13. In FIG. 12, a multi-carrier reference source 150 includes a mono-carrier source 152, such as described above in relationship to FIG. 2 and having a laser source 24, an isolator 26, and an amplifier 28, provides a single reference carrier output $f_C$ to a mixer 154 that is excited by a excitation source $f_m$ to provide outputs $f_C$, $(f_C+f_m)$, and $(f_C-f_m)$ where $f_m$ is approximately 30 GHz or the highest frequency presently supported by the modulator. The mixer 154 may take the form of an integrated optic device including a lithium niobate substrate 156 and a titanium doped channel 158 with the electrodes 160 and 162 deposited or otherwise formed on opposite sides of the channel 58 for connection to the excitation source $f_m$. As can be appreciated, the arrangement of FIG. 12 may be used repeatedly or in an iterative manner to provide a multitude of spectrally spaced carriers for introduction into the reference carrier bus 52. In the multi-carrier reference source 164 of FIG. 13, fixed frequency optical energy at a frequency $f_C$ is provided through an input optical fiber 166 through a lens 168 to an acousto-optic cell 170 having a transducer 172 connected to an excitation source $f_m$. The acousto-optic cell 170, in response to excitation from source $f_m$, is effective to modulate the source frequency $f_C$ and diffract an output through collimating lenses 174 and 174' to output optical fibers 176 and 176', the output frequencies being $f_C$ and $(f_C+f_m)$.

Figure 14:
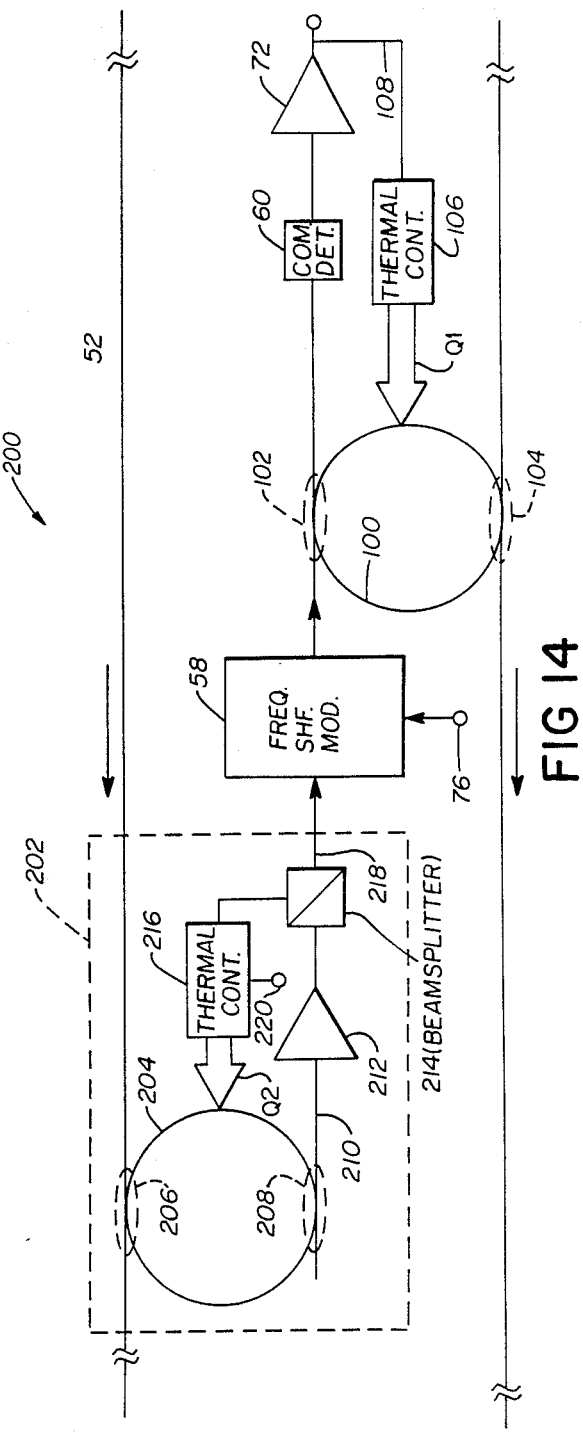
FIG. 14 is a schematic diagram of a portion of a optical communication system employing single sideband signal topology using multiple system reference carriers.

A terminal device suitable for use in a multireference carrier system is illustrated in FIG. 14 and designated generally therein by the reference character 200. The terminal device 200 is configured in a manner similar to that described above in relationship to FIG. 10 with like reference characters referring to like parts. Each terminal device 200 of the multi-reference carrier system includes a reference carrier tuner, generally designated by the reference 202, for selecting one of the available reference carriers $f_C$ (FIG. 11) for use by a terminal device $TD_n$. Each reference carrier tuner 202 includes a resonant cavity structure, preferably in the form of a resonant loop 204, laterally coupled to the reference carrier bus 52 through a lateral coupling 206 and also coupled through another lateral coupling 208 to the input link 210 of an optical amplifier 212. The output of optical amplifier 212 is provided to a beam splitter 214 or equivalent device which provides a portion of the output to a thermal controller 216 which provides a greater or lesser amount of thermal energy along thermal path Q2 to control the resonant characteristics of the resonant loop 204. Reference carrier energy not presented to the thermal controller 216 by the beam splitter 214 is presented to the frequency shift modulator 58 along a coupling link 218. The reference carrier tuner 202 functions to remove a portion of the reference carrier energy of a selected one of the available reference carriers $f_{C1}, F_{C2}, \ldots f_{Cn-1}, f_{Cn}$ with the removed energy resonantly supported in the resonant loop 204 for transfer to and amplification in the optical amplifier 212. The energy provided by the beam splitter 214 causes the thermal controller 216 to change the quantity of thermal energy presented along thermal path Q2 to alter the resonant characteristic of the resonant loop 204 to preferentially support the desired reference carrier $f_C$ (FIG. 11). The removed reference carrier energy is directed to the frequency shift modulator 58 for use in the manner described above for the single sideband terminal devices of FIG. 10. A control input 220 is provided to the thermal controller 216 to function as a "band select" for selecting one of the available reference carriers. By providing selectable preferably adjacent "bands", the bandwidth limitations of available optical modulators is effectively overcome to allow communications over very large portions of the optical spectrum.

In the embodiments described above, the system wide reference carrier is propagated separately on a reference carrier bus while the information signal is generated by removal of a portion of the reference carrier energy, by effecting modulation and a frequency translation of the removed reference carrier energy, and introducing the frequency translated information signal onto a separate information bus. Coherent detection is similarly accomplished by removing separately a portion of the reference carrier energy from the reference carrier bus and frequency shifting the removed energy to a frequency that equals that of the original frequency shift for the information signal to effect homodyne detection or to an offset frequency to effect heterodyne detection to provide an intermediate frequency output for subsequent processing.

While reference carrier frequency shifting at a destination terminal is preferred in systems which use bandwidth beyond the capability of standard RF receivers, reference carrier shifting at the destination terminal device can be eliminated in local area networks or subscriber loops. The originating terminal device $TD_o$ removes a portion of a reference carrier energy and effects a frequency shift to an information signal frequency. The frequency shifted energy is at the same time modulated and the RF frequency shifted modulated signal is transferred to the information signal bus for propagation to a destination terminal device $TD_d$. At the destination terminal device $TD_d$ the information signal is removed from the information signal bus and presented to the coherent detector. The reference carrier is also removed by the destination terminal device $TD_d$ and presented directly to the coherent detector of the destination terminal device to effect heterodyne detection. While using an RF receiver tuned to the difference frequency between the reference carrier and the frequency shifted signal eliminates the need to frequency shift the reference carrier energy at the destination terminal device, coherent detection is limited to the bandwidth of available APD or PIN detectors and/or RF receivers.

In the above described embodiments, it is desirable that the path lengths and corresponding propagation delays be the same for both those portions of the reference carrier energy used to provide the energy for the information signal and the energy required for information content demodulation in the coherent detector at the destination terminal device. Since the reference carrier and the information signal buses are configured as paralleled paths and each terminal device is similarly constructed, path length and propagation time delays are equalized as a result of the substantially similar path lengths. In the case where homodyne detection is used, that is, where the frequency translations of the reference carrier energy are the same for modulation at the originating terminal device and demodulation at the destination terminal device, the information recovery can be less than optimal because of phase shifts which may be introduced in one or both of the optical fibers that define the reference carrier and information signal buses, these phase shifts often times being independent of any physical path length differences.

Figure 15:
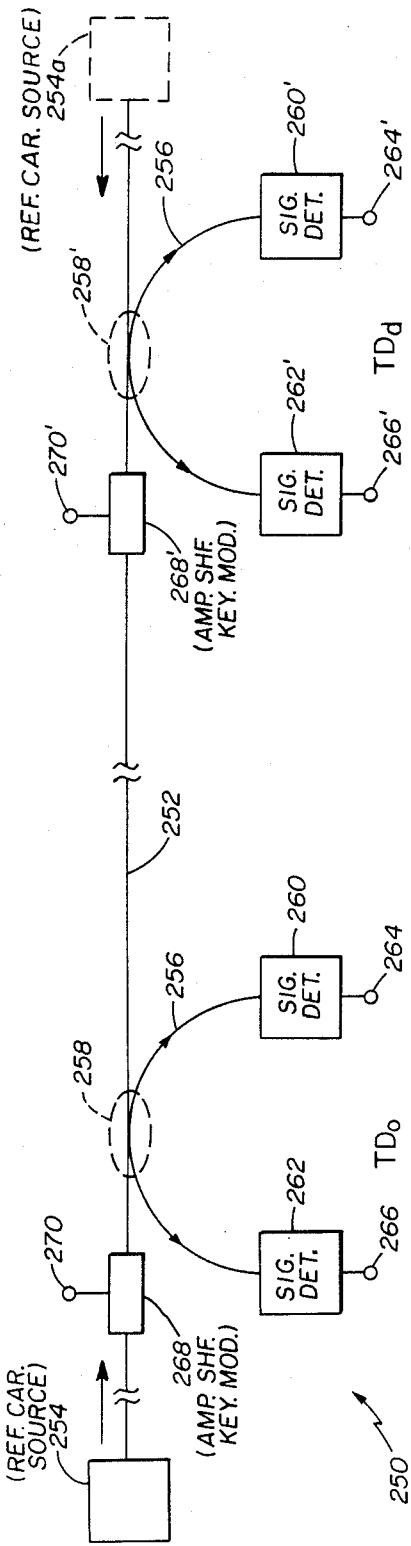
FIG. 15 is a schematic illustration of an optical communication system using a single optical fiber bus for carrying the information signal and the reference carrier information.

In order to optimize homodyne detection and avoid problems associated with even small phase shifts occurring in the optical fibers that separately propagate the reference carrier and the information signal energy, the communications system of FIG. 15, generally designated by the reference character 250, provides a single communications bus 252 for propagating both the system wide reference carrier and the information signal energy. As shown in FIG. 15, the communications system 250 includes the single core optical fiber communications bus 252 with a system wide reference carrier source 254, which preferably takes the form described above in relationship to FIG. 4, coupled to the bus 252 for propagating the reference carrier energy from the left to the right in FIG. 15. Terminal devices $TD_n$ are coupled to the bus 252 for transmitting or receiving information signals, with the information signals transmitted in the same direction as that of the system wide reference carrier, that is, from the left to the right in FIG. 15. Each terminal device $TD_n$ includes, as represented by the originating terminal device $TD_o$, on the left in FIG. 15, an optical coupling link 256 laterally coupled to the system bus 252 through a lateral coupling 258 or other coupling device. Signal detectors 260 and 262 are coupled to opposite respective ends of the optical coupling link 256 with the detector 260 receiving optical energy propagated from the left to the right and providing an information signal at output 264, and with the detector 262 receiving optical energy propagated from the right to the left and providing an information signal at output 266. Depending upon the frequency of the information signals at outputs 264 and 266, an RF receiver may be used to recover the signal information content. An in-line amplitude shift keying modulator 268 is provided in the communications bus 252 adjacent the lateral coupling 258 and includes an input 270 for receiving its excitation signal. The modulator 268 is of the type that varies the intensity of the optical energy that is passed through it in response to the excitation signal provided at input 270. In general, the modulation effect is in the range of 1% of the total optical amplitude. The components of the destination terminal device $TD_d$, as represented on the right in FIG. 15, are identical to those of the originating terminal device $TD_o$ with their reference characters additionally denoted by the prime symbol.

In operation, the modulator 268 of the originating terminal device $TD_o$, on the left in FIG. 15, is excited by the modulation signal provided to input 270 and functions to intensity modulate the reference carrier energy from the reference carrier source 254 to provide an information signal which is propagated from the left to the right in FIG. 15. At the destination terminal device $TD_d$, on the right in FIG. 15, the modulated information signal and reference carrier energy is passed through the lateral tap 258' into the coupling link 256' and into the coherent detector 260'. The information signal is then coherently detected with the resulting detected information presented to the output 264'.

While the system 250 of FIG. 15 has been described as unidirectional, the addition of a second reference carrier generator 254a (dotted line illustration) will allow bidirectional communications using the coherent detectors 262 and 262'.

Figure 16:
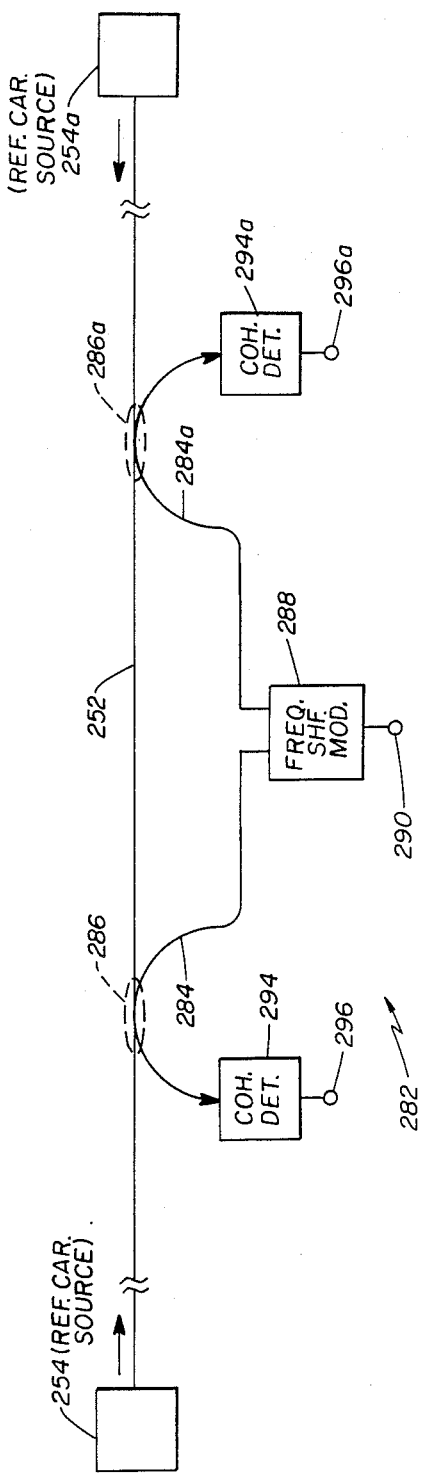
FIG. 16 is an illustration of another terminal device architecture for a communications system using a combined reference carrier and information signal bus.

If desired, the system configuration can be changed, as shown in FIG. 16, to provide a bidirectional system. As shown in FIG. 16, reference carriers are bidirectionally provided on the communications bus 252 by reference carrier sources 254 and 254a for use by terminal devices designated generally by the reference character 282. As shown, optical coupling links 284 and 284a are coupled to the communications bus 252 through respective lateral couplings 286 and 286a and to a common frequency shift modulator 288 having an input 290 for accepting a modulated RF carrier. The opposite ends of the optical coupling links 284 and 284a are connected to respective coherent detectors 294 and 294a having outputs 296 and 296a.

In order to receive a communications signal propagated from a first direction, for example, from the right to the left in FIG. 16, a portion of the leftward propagating reference carrier from the reference carrier source 254a is transferred through the lateral coupling 286a into the optical coupling link 284a and into the frequency shift modulator 288. The frequency shift modulator 288 is excited by RF energy applied to its RF input 290 to effect a frequency translation to a demodulation frequency which is presented along the optical coupling link 284 to the coherent detector 294. Additionally and concurrently therewith, an information signal travelling from right to left is transferred through the lateral coupling 286 into the optical coupling link 284 and presented to the coherent detector 294 where detection takes place to provide an output at 296. As described above and depending upon the frequency at which the frequency shift modulator 288 is excited, either heterodyne detection may take place to provide an intermediate frequency output at 296 from the coherent detector 294 or homodyne detection may take place to provide a base band signal output.

In order to receive a signal travelling from the opposite direction, that is, from the left to the right in FIG. 16, a portion of the rightwardly propagated reference carrier from reference carrier source 254 is transferred through the lateral coupling 286 into the optical coupling link 284 and presented to the frequency shift modulator 288. A RF energy input to the frequency shift modulator 288 causes a frequency translation to a demodulating frequency with this frequency presented through the optical coupling link 284a to the coherent detector 294a. Additionally and concurrently therewith, a portion of the rightwardly propagating information signal is transferred from the communications bus 252 through the lateral coupling 286a into the coupling link 284a and presented to the coherent detector 294a which provides either an intermediate frequency or a base band frequency output at 296a as a consequence of its demodulation function.

The systems described above in relationship to FIG. 15 and 16 function in a manner analagous to the double bus systems described above to provide a double sideband information signal in which both the upper and lower sidebands of the modulated signal carry the full information content. In order to increase spectral utilization and signal transmission density and to avoid interference between the phase of the sidebands and the reference carrier, a single sideband, single bus system may be used in accordance with the arrangements of FIGS. 17, 18 and 19.

As shown in FIG. 17, a single bus, single sideband system is designated generally by the reference character 300 includes an originating terminal device $TD_o$ and a destination terminal device $TD_d$ coupled to a unidirectional communications bus 302 which carries both the reference carrier and information signal energy. Each terminal device includes a frequency shift modulator 304 coupled to an optical coupling link 306 which, in turn, is coupled through a lateral coupling 308 to the communications bus 302. An input 310 is provided for the frequency shift modulator 304 for accepting a modulated RF carrier to excite the modulator. The output of the frequency shift modulator 304 is provided through an optical coupling link 314 to the coherent detector 316 which, in turn, provides an output to an output port 318. A resonant loop 320 is interposed between the optical coupling link 314 and the communications bus 302 through respective lateral couplings 322 and 324.

In operation, an originating terminal device, such as the terminal device $TD_o$ shown on the left in FIG. 17, removes a portion of the reference carrier energy from the communications bus 302 through the lateral coupling 308 for presentation through the optical coupling link 306 to the frequency shift modulator 304. The frequency shift modulator 304 is excited by the modulated RF carrier energy presented at input 310 to provide a double sideband modulated signal to the optical coupling link 314. The modulated, frequency shifted energy is transferred through the lateral coupling 322 into the resonant loop 320. The resonant characteristics of the resonant loop 320 are selected to resonantly support one sideband only of the double sideband suppressed carrier energy presented through the lateral coupling 322. The supported sideband, be it the upper or the lower sideband, is transferred through the lateral coupling 324 into the communications bus 302 for propagation toward the right in FIG. 17.

A terminal device operating in a receive mode, as represented by the destination terminal device $TD_d$ on the right in FIG. 17, functions to remove a portion of the reference carrier energy through the lateral coupling 308' and present the energy through the optical coupling link 306' to the frequency shift modulator 304'. Radio frequency energy provided through the input port 310' excites the frequency shift modulator 304' to effect a frequency translation of the reference carrier energy to a shifted frequency with this energy presented to the coherent detector 316' through the optical coupling link 314'. Additionally, a portion of the single sideband information signal energy transferred through the lateral coupling 324' and resonantly supported in the resonant loop 320' is transferred through the lateral coupling 322' into the optical coupling link 314' for presentation to the coherent detector 316'. Depending upon the frequency translation of the reference carrier energy provided by the frequency shift modulator 304', the output of the coherent signal detector 316' available at the output port 318' may be a modulated intermediate frequency signal or base band information. As can be appreciated from the above, the system of FIG. 17, in utilizing a single sideband arrangement, provides increased spectral usage over systems employing a double sideband and avoids the need to phase-lock the modulated signal reinserted into the bus 302 at the lateral coupling 324 with respect to the reference carrier.

While resonant loops of the type represented by the resonant loops 320 and 320' of FIG. 17 are preferred for the resonant structures of single sideband terminal devices, other resonant structures are suitable. For example and as shown in FIG. 18, a frequency shift modulator 304 is configured as part of an optical circuit 326 that is coupled to the communications bus 302 through a schematically represented lateral coupling 328. The optical circuit 326 includes a Fabry Perot resonator 330 having opposed mirrors 332 and 334 or equivalent reflectors and an intermediate transmission medium 336. The Fabry Perot resonator 330 will preferentially support selected wavelengths in a manner analagous to the resonant loop structures 320 and 320' of FIG. 17. The selected wavelengths can include either an upper or lower sideband of a double sideband modulated signal generated by the frequency shift modulator 304 in response to radio frequency and information signals presented to the input port 310.

Figure 19:
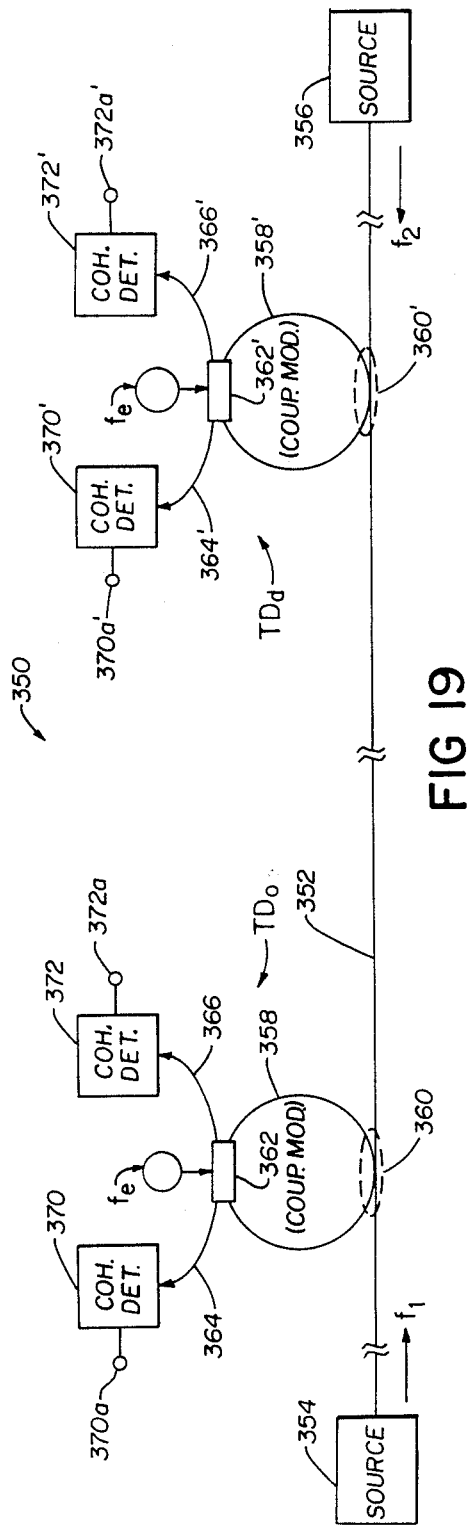
FIG. 19 is a schematic illustration of a communications system in accordance with the present invention utilizing a multiport input/output coupler and a combined system reference carrier and information signal bus for bidirectional communications.

A communications system using a single resonant structure and a switchable modulator in a bidirectional terminal device is illustrated in FIG. 19 and is designated generally by the reference character 350. As shown, the system 350 includes an open communications bus 352 for propagating a first reference carrier from a first source 354 at a first reference carrier frequency $f_1$ from the left to the right and from a second reference carrier source 356 at a second reference carrier frequency $f_2$ from the right to the left. Each terminal device includes a loop 358 coupled to the communications bus 352 through a lateral coupling 360 which loop 358 may but need not be resonant. A four port input/output coupling modulator 362, described below, is coupled into the loop 358, as well as optical coupling links 364 and 366 which are connected, respectively, to coherent detectors 370 and 372 having respective outputs 370a and 372a. The coupling modulator 362 is controlled via a combined control and excitation source $f_e$.

Figure 21:
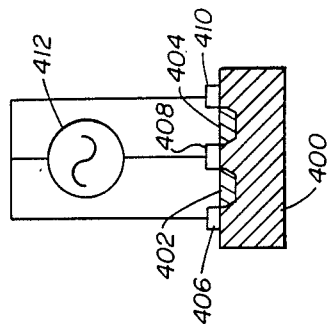
FIG. 21 is a cross sectional view of the multiport input/output coupler and modulator of FIG. 20 with a controllable oscillator shown.
Figure 20:
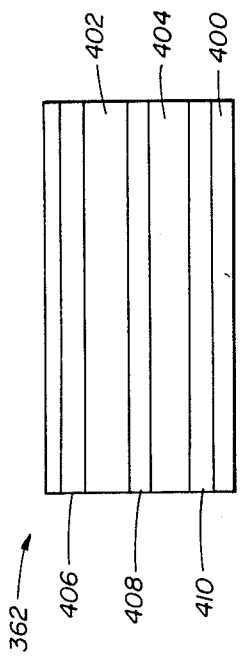
FIG. 20 is a plan view of a multiport input/output coupler and modulator used in the system of FIG. 19.

As shown in FIGS. 20 and 21, the four port input/output modulators 362 are each defined by a substrate 400 fabricated from an electro-optic material such as lithium niobate, and include adjacent spaced apart optical guide channels 402 and 404, which may be formed, for example, by appropriate doping with a titanium dopant, and electrodes 406, 408, and 410 deposited or otherwise formed upon the substrate 400 adjacent the channels 402 and 404. A controllable oscillator 412 is connected to the electrodes 406, 408, and 410 for and functions as the controllable excitation source $f_e$ for controlling the transmission characteristics of the channels 402 and 404, that is, for effectively isolating one channel from the other or allowing cross coupling between the channels 402 and 404 as well as effecting modulation.

When operating as a transmitter, the coupling modulator 362 of the originating terminal device $TD_o$ of the system 350 of FIG. 19 is controlled to remove a portion of the reference carrier energy from the communications bus 352 through the lateral coupling 360 for introduction into the loop 358 and propagation through the frequency shift modulator 362 which is controlled to frequency shift and modulate the signal for reintroduction through the lateral coupling 360 into the system bus 352. To insure that the phase of the double sideband intensity modulated signal from the modulator 362 is in proper phase relationship with the reference carrier to produce an amplitude shift keyed signal when reinserted back onto the bus, a feedback circuit (not shown) which can take the form, for example, of a thermal control loop (FIG. 10), must be employed, to control the optical length of the loop 358. When operating in a receive mode, such as the destination terminal device TDd shown on the right in FIG. 19, a portion of the information signal from the system bus 352 is coupled through the lateral coupling 360' into the resonant loop 358' and to the frequency shift modulator 362' which is controlled to allow coupling between channels to present the information signal to one or the other of the coherent detectors 370' or 372'. If the coupling control is static, then the received signal is at a frequency equal to the difference between the reference carrier and the information signal from the originating terminal device $TD_o$. If the coupling constant is modulated with an RF carrier, detection occurs at the difference frequency.

Figure 22:
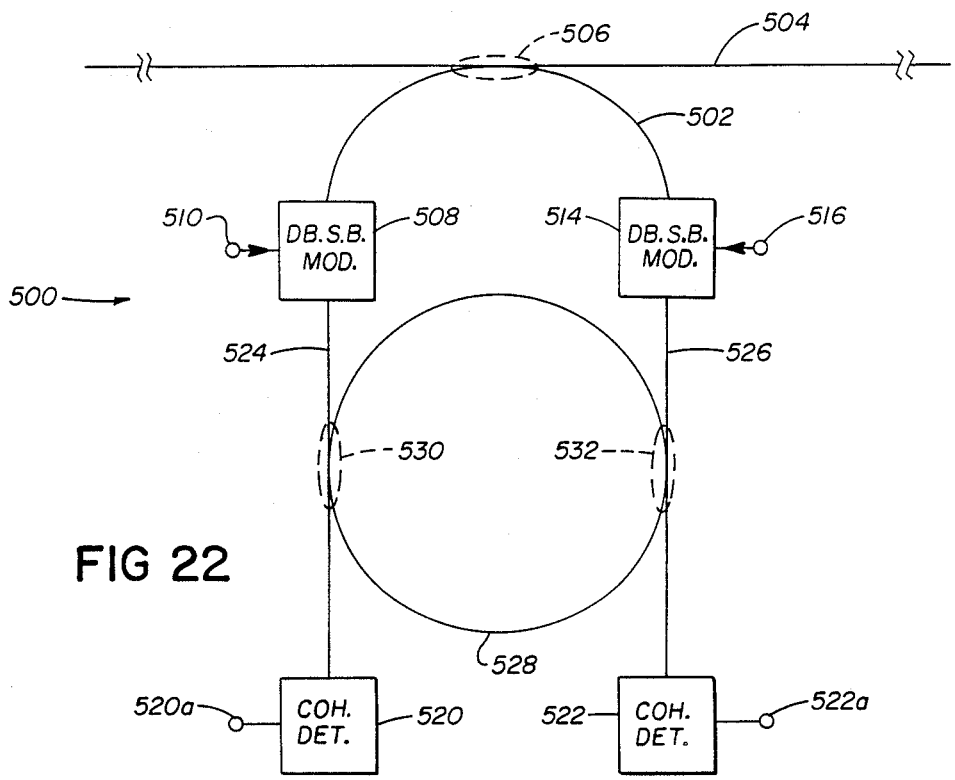
FIG. 22 is an illustration of an alternate embodiment of a bidirectional communications terminal utilizing resonant loop structures and a combined reference carrier and information signal bus.

Another embodiment of a single sideband terminal device is illustrated in FIG. 22 and designated generally therein by the reference character 500. As shown, the terminal device 500 includes an optical coupling link 502 coupled to a combined information and reference carrier bus 504 through a lateral coupling 506 and also coupled to a double sideband modulator 508 having a modulated RF carrier input 510 and another double sideband modulator 514 having a modulated RF carrier input 516. The double sideband modulators 508 and 514 are coupled, respectively, to coherent detectors 520 and 522 through coupling links 524 and 526. The coherent detectors 520 and 522 include respective outputs 520a and 522a. A resonant loop 528 is coupled intermediate the optical coupling links 524 and 526 through respective lateral couplings 530 and 532. For transmitting in one direction, a portion of the reference carrier energy is removed from communications bus 504 and presented to the appropriate modulator, 508 or 514. The removed reference carrier energy is frequency translated and modulated to present a double sideband suppressed carrier signal to the resonant loop 528. One of the sidebands, that is, an upper or lower sideband, is coupled through the resonant loop 528 and passed through the other, unexcited modulator for introduction onto the communications bus 504 through the lateral coupling 506. For receiving, a portion of the reference carrier energy is removed through the lateral coupling 506 from the communications bus and presented through an excited modulator for frequency translation and presentation to a detector. Concurrently, an information signal is removed from the communications bus 504 and the unmodulated portion passed through the same modulator used by the detector for demodulation and signal recovery.

Figure 23:
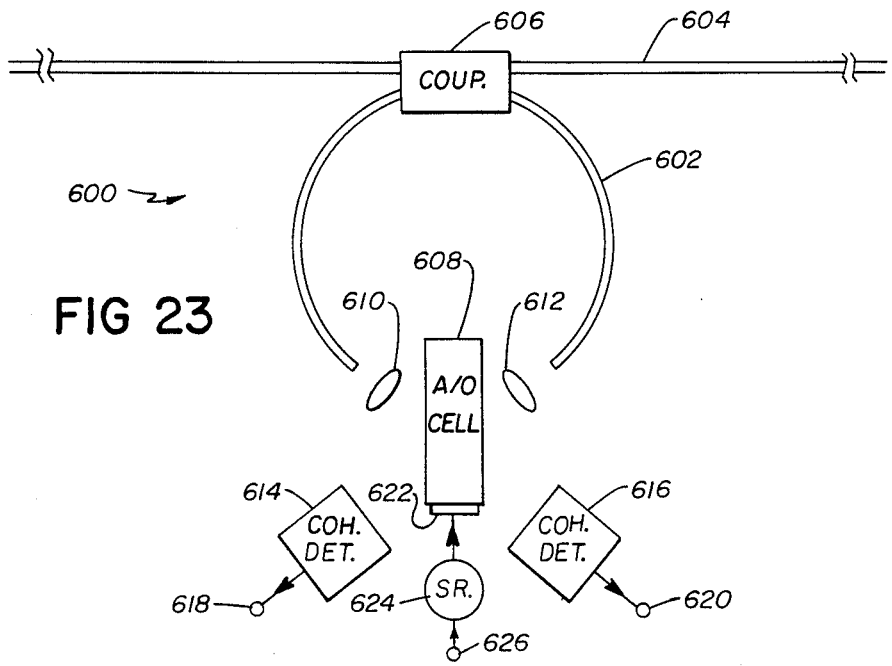
FIG. 23 is a schematic illustration of an acousto-optic modulator for use in optical communications system in accordance with the present invention.
Figure 24:
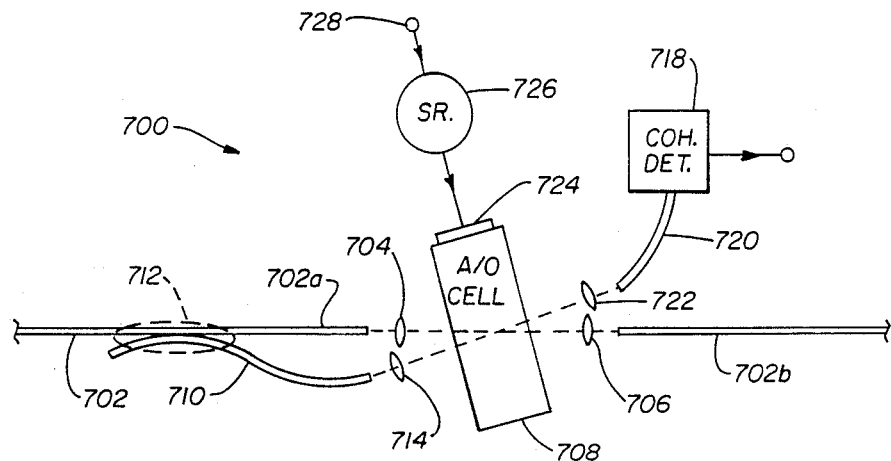
FIG. 24 is a schematic illustration of a single sideband terminal device utilizing an acousto-optic modulator.
Figure 25:
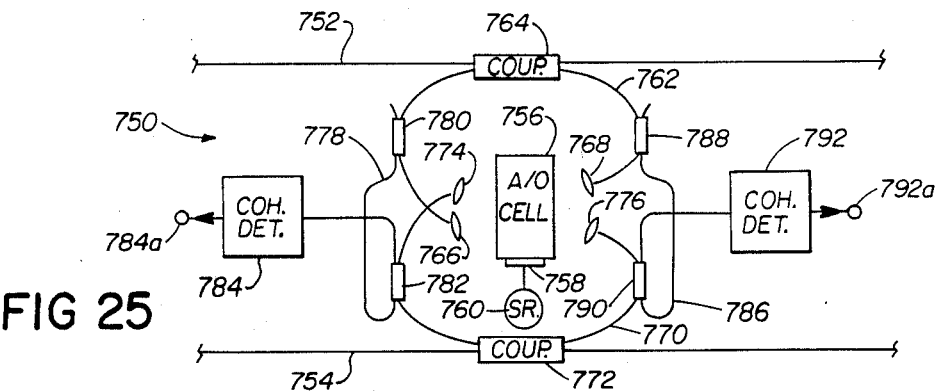
FIG. 25 is a schematic illustration of another terminal device utilizing an acousto-optic modulator.

In the embodiments described above, the frequency shift modulators have been presented principally as bulk or integrated optic devices. Terminal devices $TD_n$ incorporating acousto-optic devices, as shown in FIGS. 23, 24, and 25, are likewise suitable for use in communications systems in accordance with the present invention. It should be noted that the acousto-optic Bragg diffraction modulator inherently produces a single sideband suppressed carrier output. As shown in FIG. 23, a terminal device incorporating an acousto-optic frequency shift modulator is designated generally by the reference character 600. As shown, an optical coupling link 602 is coupled to a combined information signal and reference carrier communications bus 604 through a schematically represented coupling 606. An acousto-optic cell 608 is positioned intermediate the spaced ends of the optical coupling link 602 with lenses 610 and 612 positioned between the acousto-optic cell 608 and the ends of the optical coupling link 602 for directing acoustically diffracted light energy between the acousto-optic cell 608 and the optical coupling link 602. Coherent detectors 614 and 616 having output ports 618 and 620, respectively, are positioned on opposite sides of the acousto-optic cell 608 for receiving undiffracted light energy passed through the acousto-optic cell 608 from the lens 612 and the lens 610, respectively. A transducer 622 is excited by source 624 having a modulated RF carrier input 626 for driving the acousto-optic cell 608 and effecting modulation and frequency translation.

When the terminal device 600 is operating as a transmitter, reference carrier energy, for example, energy propagated from left to right in FIG. 23, is transferred through the coupling 606 into the optical coupling link 602 and directed through the lens 612 into the acousto-optic cell 608. The RF source 624 excites the acousto-optic cell 608 to diffract, frequency translate, and modulate the removed reference carrier energy provided from the lens 612. The diffracted light is then passed through the lens 610 and into the optical coupling link 602 for transfer through the coupling 606 into and propagation along the communications bus 604.

When the terminal device 600 is operating in a receive mode, the information signal, for example, a signal propagated from the left to the right in FIG. 23, is coupled through the coupling 606 into the optical coupling link 602 and directed through the lens 612 into the acousto-optic cell 608. The undiffracted light passing through the acousto-optic cell 608 is used to detect directly the information signal arriving at the coherent detector 614 at the RF difference frequency between the RF carrier and a superimposed RF signal from an upstream terminal device. The output of coherent detector represents modulated radio frequency energy which can be feed directly to a RF receiver (not shown).

The architecture of the terminal device of FIG. 24, designated generally by the reference character 700, differs from those disclosed above in that the communications bus 702 is opened to define bus portions 702a and 702b with lenses 704 and 706 for efficiently directing light energy to and from an acousto-optic cell 708. An optical tap fiber 710 is laterally coupled to the bus portion 702a through a lateral coupling 712 and includes a lens 714 for directing light through the acousto-optic cell 708 at a small angle. The lateral coupling 712 is typically made small to couple only a small percentage of the light from the fiber 702 to the optical tap fiber 710. A coherent detector 718 receives its optical input through a coupling fiber 720 having a lens 722 co-aligned with the lens 714. The acousto-optic cell 708 includes a transducer 724 and is excited by a source 726 which includes a modulated RF carrier input 728. When the terminal device 700 is operating in a transmit mode, reference carrier energy is transferred from the bus portion 702a through the lateral coupling 712 into the optical tap fiber 710 and presented to the acousto-optic cell 708 through the lens 714. The acousto-optic cell 708 is excited by the source 726 to effect frequency translation and modulation and present the diffracted energy from fiber 710 to the lens 706 for propagation into the bus portion 702b. When operating in the receive mode, a portion of the signal information is transferred through the lateral coupling 712 into the optical tap fiber 710 which then passes undiffracted by the acousto-optic modulator 708 to be coupled into the fiber 720 via the lens 722 to arrive at the detector 718. The acousto-optic cell 708 is excited to effect a frequency shift of the reference carrier energy thereby diffracting a small portion of the carrier into the lens 722 and to the coherent detector 718 through the fiber 720.

Figure 24A:
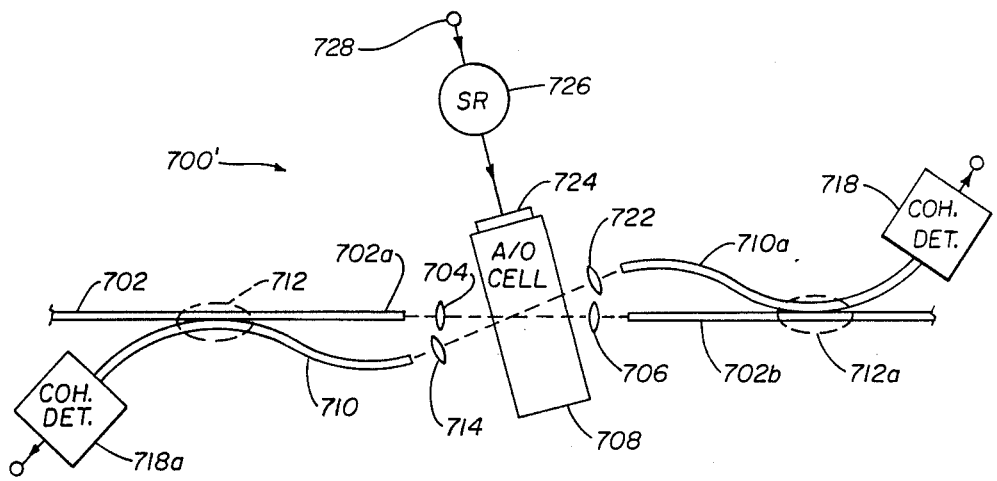
FIG. 24a is a schematic illustration of a bidirectional single sideband variation of the terminal device of FIG. 24.

A bidirectional variation of the terminal device 700 of FIG. 24 is illustrated in FIG. 24a and designated by the reference character 700' with like parts designated by like reference characters. As shown in FIG. 24a, a detector 718a is coupled to the optical tap fiber 710 and an optical tap fiber 710a is laterally coupled to the bus portion 702b through lateral coupling 712a with the detector 718 coupled to the end of the optical tap fiber 710a. When operating to transmit information from the left to the right in FIG. 24a, reference energy is transferred from the bus portion 702a through the lateral coupling 712 into the optical tap fiber 710 for transfer through the lens 714 to the acousto-optic cell 708. The reference carrier energy is frequency translated and modulated by the acousto-optic cell 708 with the diffracted single sideband energy introduced into the bus portion 702b through the lens 706. Conversely, for transmitting information from the right to the left in FIG. 24a, reference carrier energy propagated from the right to the left is transferred through the lateral coupling 712a into the optical coupling tap 710a is presented to the acousto-optic cell 708 by the lens 722. The modulated, frequency translated, and diffracted energy provided by the excited acousto-optic cell 708 is then passed into the bus portion 702a by the lens 704 for continued propagation. For receiving information signals propagated from the left to the right, a portion of the information signal is transferred through the lateral coupling 712 into the optical tap coupling 710 and through the lens 714 and the acousto-optic cell 708 and is passed undiffracted through the lens 722 into the optical tap fiber 710a to the detector 718. Conversely, for receiving information signals propagated from the right to the left, a portion of the information signal is transferred through the lateral coupling 712a into the optical tap coupling 710a, through the lens 722, and the acousto-optic cell 708 and is passed undiffracted through the lens 714 into the optical tap fiber 710 to the detector 718a.

A bidirectional terminal device utilizing an acoustooptic cell in a double bus system is illustrated in FIG. 25 and designated generally therein by the reference character 750. As shown, the system includes a reference carrier bus 752 and an information signal bus 754 with the terminal device 750 including an acousto-optic cell 756 having a transducer 758 excited by a suitable source 760. An optical coupling link 762 is coupled to the reference carrier bus 752 through a lateral coupling 764 and includes lenses 766 and 768 for directing light energy to and from the acousto-optical cell 756. In a similar manner, another optical coupling link 770 is coupled to the information signal bus 754 through a lateral coupling 772 and includes lenses 774 and 776 for directing and receiving light energy from the acousto-optic cell 756. Another optical connecting link 778 is connected to the optical coupling link 762 by a lateral coupling 780 and to the optical coupling link 770 by another lateral coupling 782 and directs light energy into a coherent detector 784. In a similar manner, an optical coupling link 786 is connected to the optical coupling link 762 through a lateral coupling 788 and to the optical coupling link 770 through another lateral coupling 790 for directing optical energy into the coherent detector 792. The coherent detectors 784 and 792 have respective signal outputs 784a and 792a.

When operating as a transmitter in a first direction, for example, from the left to the right, a portion of the reference carrier travelling from energy left to right from the reference carrier bus 752 is transferred through the lateral coupling 764 into the optical coupling link 762 where it is presented through lens 768 to the acousto-optic cell 756. The optical energy is modulated, frequency translated, and diffracted by the acousto-optic cell 756 through the lens 774 and into the optical coupling link 770 for transfer through the lateral coupling 772 toward the right on the information signal bus 754. When operating as a transmitter in the opposite or leftward propagating direction, a portion of the oppositely directed reference carrier energy is transferred through the lateral coupling 764 into the optical coupling link 762 for presentation through the lens 766 into the acousto-optic cell 75 where the reference carrier energy is frequency translated, modulated, and diffracted into the lens 776 for propagation through the optical coupling link 770 and transfer through the lateral coupling 772 into the information signal bus 754 in a leftward direction.

When operating in the receive mode, for example, when receiving information signals propagated from the left to the right in FIG. 25, a portion of the rightwardly propagated information signal is transferred from the information signal bus 754 through the lateral coupling 772 into the coupling link 770 and through the lateral coupling 790 into the coupling link 786 and into the coherent detector 792. Concurrently, a portion of the rightwardly propagated reference carrier energy is transferred from the reference carrier bus 752 through the lateral coupling 764, the optical coupling link 762, and the coupling 788 for presentation to the coherent detector 792. The coherent detector output at 792a is connected to an RF receiver for information content recovery. Conversely, for receiving information signals propagated from the right to the left in FIG. 25, a portion of the leftwardly propagated information signal is transferred through the lateral coupling 772 into the coupling link 770 and through the lateral coupling 782 into the coupling link 776 and into the coherent detector 784. Concurrently, a portion of the leftwardly propagated reference carrier energy is transferred from the reference carrier bus 752 through the lateral coupling 764, the optical coupling link 762, and the lateral coupling 780 for presentation to the coherent detector 784. The detector output at 784a is connected to an RF receiver for information content recovery.

In the various acousto-optic embodiments described above, single sideband amplitude modulation has been used to illustrate the invention. In addition, other modulation techniques are suitable including, phase modulation systems as illustrated by the double bus phase modulated system of FIG. 26 and the single bus phase modulated system of FIG. 27. Where phase modulators are employed, a phase relationship control arrangement is required to maintain the proper phase relationship between the reference carrier energy and the information carrying energy. Thus, in a double bus system, a phase control loop is desired at the receiver site, and, in a single bus system, a phase control loop is desired at the transmitter site.

Figure 26:
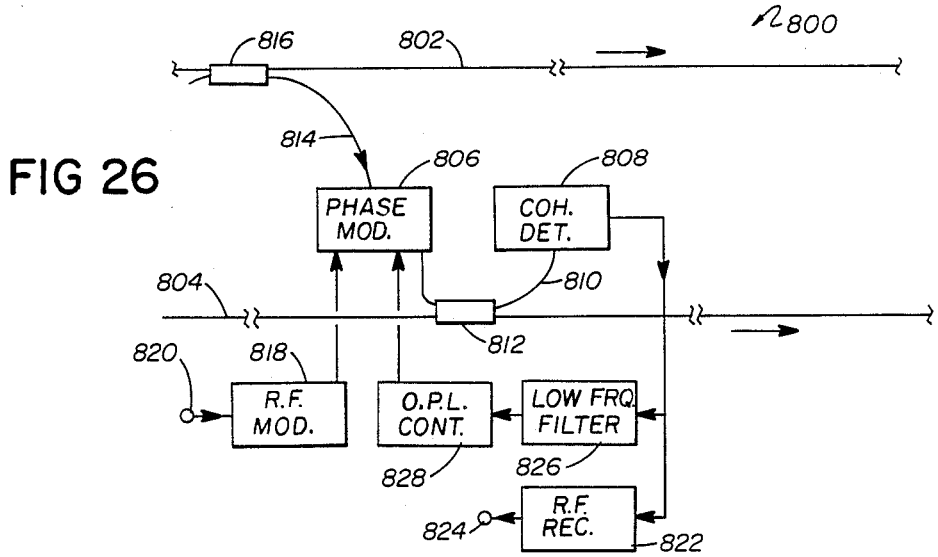
FIG. 26 is a schematic illustration of a first embodiment of a terminal device for phase or intensity modulating an information signal.

As shown in FIG. 26, a double bus double sideband phase modulator system is designated generally by the reference character 800 and includes terminal devices $TD_n$, coupled between a reference carrier bus 802 and an information signal bus 804 with both buses propagating their respective optical energy from the left to the right in FIG. 26. Each terminal device includes a phase shift modulator 806 and a coherent detector 808 with an optical coupling link 810 connecting the phase modulator 806 and the coherent detector 808 through a lateral coupling 812 which effects coupling between the optical coupling link 810 and the information signal bus 804. Another optical coupling link 814 couples the phase modulator 806 to the reference carrier bus 802 through a lateral coupling 816. The phase modulator 806 is excited by an RF modulator 818 which accepts a modulated RF carrier input at input port 820. The output of the coherent detector 808 is provided to a radio frequency receiver 822 which provides a demodulated output signal at an output port 824. In order to control the phase relationship between the reference carrier energy propagated in the bus 802 and the information signal propagated in the information signal bus 804, the output of the coherent detector 808 is also provided through a low frequency filter 826 to an optical path length controller 828 which provides an output to control the phase modulator 806. The optical path length controller 828 may take the form, for example, of a thermal path length controller. Since the information signal on a double bus system is combined with the reference carrier energy at the receiver, as described below, phase control of the two signals is provided at the receiver site, as distinguished from the double sideband, single bus system, also described below.

When operating in a transmit mode, a portion of the reference carrier energy is removed from the reference carrier bus 802 and transferred through the lateral coupling 816 into the optical coupling link 814 for presentation to the phase modulator 806. The RF modulator 818 is effective to modulate the phase of the reference carrier energy in accordance with the information signal and effect a frequency translation in accordance with the RF carrier provided from the input 820 and present the phase modulated frequency translated signal through a lateral coupling 812 into the information signal bus.

When operating in a receive mode, the reference carrier energy is removed from the reference carrier bus 802 through the lateral coupling 816 and propagated along the optical coupling link 814 through the phase shift modulator 806 and the optical coupling link 810 into the coherent detector 808. Simultaneously, the information signal is transferred from the information bus 804 through the lateral coupling 812 into the coherent detector 808. The output of the coherent detector is provided to the RF receiver 822. In order for the coherent detector to operate properly, it is preferable that the phase relationship between the reference carrier energy and the information signal be maintained so the combined energy appears as an intensity modulated signal at the coherent detector 808. Accordingly, a portion of the output of the coherent detector 808 is passed through the low frequency filter and presented to the optical path length controller 828 which then controls the phase shift modulator 806 to provide the desired phase relationship control.

Figure 27:
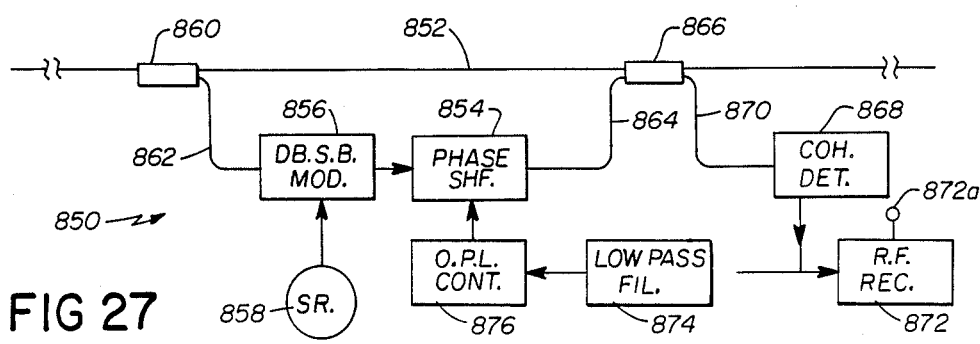
FIG. 27 is a schematic illustration of a second embodiment of a terminal device for phase or intensity modulating an information signal.

A single bus double sideband modulation terminal device is shown in schematic illustration in FIG. 27 and designated generally therein by the reference character 850. As shown, the system includes a communications bus 852 that carries the reference carrier and information energy and a phase shifter 854 connected to a double sideband modulator 856 driven by a modulated RF carrier source, indicated generally at 858. A lateral coupling 860 serves to transfer a portion of the reference carrier energy present in the communications bus 852 through an optical coupling link 862 to the double sideband modulator 856 for transfer through the modulator 856 and the phase shifter 854 into another optical coupling link 864 which presents the phase shifted energy through another lateral coupling 866 for return and propagation in the communications bus 852. A coherent detector 868 is coupled to the lateral coupling 866 through an optical coupling link 870. The output of the coherent detector 868 is provided to a radio frequency receiver 872 and also to a low pass filter 874 and a path length controller 876 which is connected to and effects control of the phase shifter 854. Since the information signal is inserted onto the communications bus 852 at the transmitter, the phase control is provided at the transmitter as distinguished from the double bus system of FIG. 26 where the phase control is provided during receiving.

When operating in a transmit mode, a portion of the reference carrier energy from the communications bus 852 is transferred through the lateral coupling 860 and into the optical coupling link 862 for presentation to the double sideband modulator 856. The reference carrier energy is modulated in accordance with the modulated RF carrier presented by the source 858 with the modulated output provided to the phase shifter 854 effecting phase shift control of the energy for presentation through the optical coupling link 864 and the lateral coupling 866 for propagation as an information signal in the communications bus 852. Concurrently, a portion of the phase modulated signal via link 864 and a portion of the reference carrier energy coupled into the optical coupling link 870 via the lateral coupling 866 are also presented to the coherent detector 868, the joint detection of which provides an output through the low pass filter 874 to the path length controller 876 which is effective to control the phase shifter 854. Proper control of the double sideband phase modulated signal inserted onto the communications bus 852 at the lateral coupling 866 with respect to the reference carrier energy causes the phase shift modulated signal to be converted to an intensity modulated signal which can be directly detected at any downstream location. When operating in a receive mode, a portion of the information signal is transferred through the lateral coupling 866 into the coherent detector 868 along with a portion of the reference carrier energy or, alternatively, with a portion of the reference carrier energy transferred through the lateral coupling 860, the modulator 856 and the phase shifter 854 for transmission to the coherent detector through the optical coupling links 864 and 870.

In the various embodiments described above, the reference carrier energy has been used for supplying energy that is modulated to result in the information signal and used for supplying energy that is used in effecting coherent detection. In accordance with the present invention, a communications system can employ a plurality of reference carriers, including a first fixed frequency reference carrier that provides energy to be modulated to result in the information signal and another fixed frequency reference carrier that provides the energy used for coherent detection of the information signals. A double bus communications system that uses respective reference carriers for the information signal and for coherent detection is disclosed in FIG. 28 and a single bus system that uses respective reference carrier energy information and coherent detection in different polarization states is illustrated in FIG. 29.

Figure 28:
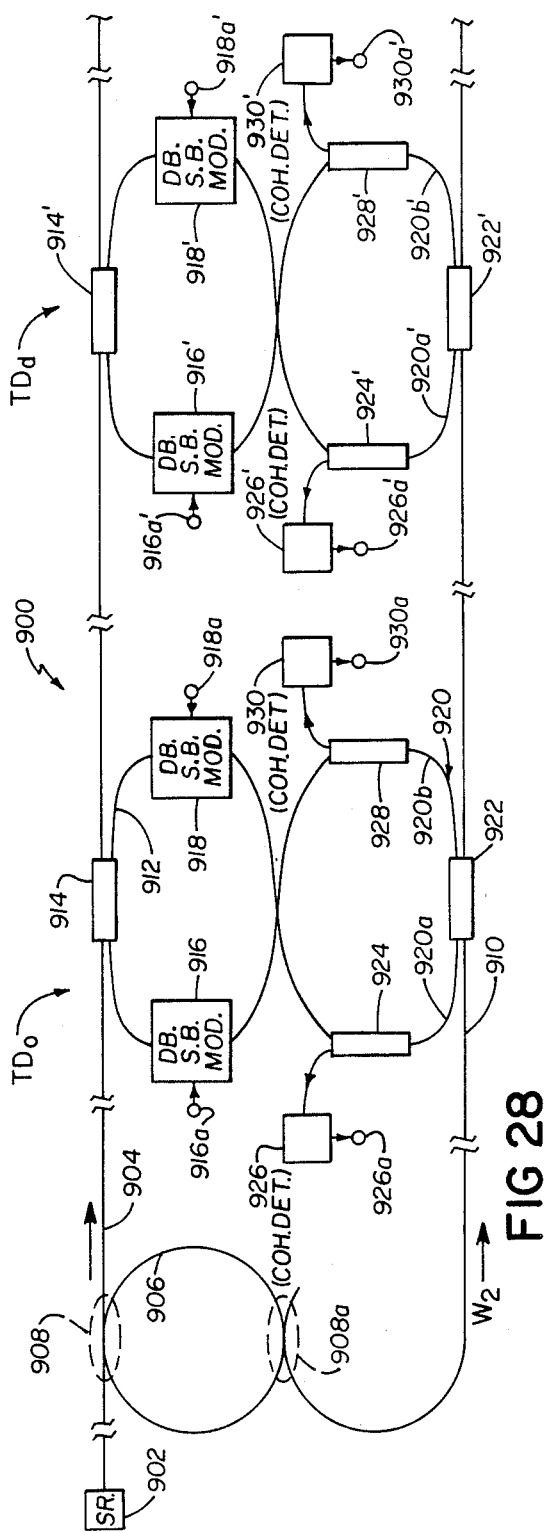
FIG. 28 is a schematic illustration of a double bus communications system that utilizes a first reference carrier for generating an information signal and another reference carrier for coherent detection purposes.

As shown in FIG. 28, a double bus communications system using first and second fixed frequency reference carriers for providing, respectively, energy for modulation as the information signal and for providing energy for coherent detection is designated generally by the reference character 900 and includes an originating terminal device $TD_o$ and a destination terminal device $TD_d$. The system 900 is bidirectional in that reference carriers and information signals can be transmitted from the left to right or from the right to left. In FIG. 28, the system has been presented for purposes of illustration as transmitting reference carrier and information signals from the left to the right. A reference carrier source 902 generates first and second fixed frequency reference carriers at frequencies $w_1$ and $w_2$ and presents the reference carrier energy to the reference carrier bus 904. A resonant loop 906, which functions as a passband filter as described below, is coupled to the reference carrier bus 904 through a lateral coupling 908. The information signal bus 910 is coupled to the resonant loop 906 through another lateral coupling 908a. The resonant loop 906 is tuned to the frequency of one of the reference carriers, for example, the reference carrier at frequency $w_2$, so that reference carrier energy at the frequency $w_2$ will be passed through the lateral coupling 908, the resonant loop 906, and the lateral coupling 908a for propagation along the information signal bus 910. Reference carrier energy at frequencies other than the frequency $w_2$, namely, reference carrier energy at the frequency $w_1$ will pass by the lateral coupling 908 and will continue along the reference carrier bus 904.

Since the system 900 is bidirectional, a similar reference carrier generator and resonant loop structure (not shown) is provided at the opposite terminus of the system 900 to provide oppositely propagating reference carriers.

Each terminal device, such as the originating terminal device $TD_o$ on the left in FIG. 28, includes an optical coupling link 912 that is laterally coupled through a lateral coupling 914 to the reference carrier bus 904 and connected at its opposite ends to double sideband modulators 916 and 918. Each double sideband modulator 916 and 918 includes respective inputs 916a and 918a for accepting a modulated RF carrier bearing the information content to be propagated to a destination terminal device $TD_d$. Another optical coupling link 920 is coupled through a lateral coupling 922 to the information signal bus 910 with a first portion 920a of the optical coupling link 920 connected to the double sideband modulator 918 and through a lateral coupling 924 to a coherent detector 926. A second portion 920b of the optical coupling link 920 is connected to the double sideband modulator 916 and through a lateral coupling 928 to another coherent detector 930. The coherent detectors 926 and 930 have respective outputs 926a and 930a at which the detected signal is presented. While the optical coupling links 920a and 920b are shown crossing over each other in FIG. 28, they are optically independent of one another.

When a terminal device, such as the terminal device $TD_o$, is functioning in a signal transmission mode, a portion of the reference carrier energy at the frequency $w_1$ propagated along the reference carrier bus 904 is transferred through the lateral coupling 914 and the optical coupling link 912 into the double sideband modulator 918 with the reference carrier energy at frequency $w_1$ modulated in accordance with the content of the modulated RF carrier presented at the input 918a, the modulated RF carrier having a frequency $w_{rf}$. The double sideband output is propagated along the optical coupling link 920a past the lateral coupling 924 and through the lateral coupling 922 for propagation into and along the information signal bus 910 in the direction of a destination terminal device $TD_d$.

When a terminal device, such as the terminal device $TD_d$, is functioning in a signal receiving mode, a portion of the reference carrier energy at the frequency $w_2$ propagated in the information signal bus 910 is transferred through the lateral coupling 922' into the optical coupling link 920b' and through the lateral coupling 928' into the coherent detector 930'. Concurrently, the information signal from the originating terminal device $TD_o$ is also transferred through the lateral coupling 922' into the optical coupling link 920' and through the lateral coupling 928' and presented to the coherent detector 930', where coherent detection takes place. The output of the coherent detector 930' is presented at the terminal 930a'.

Figure 28A:
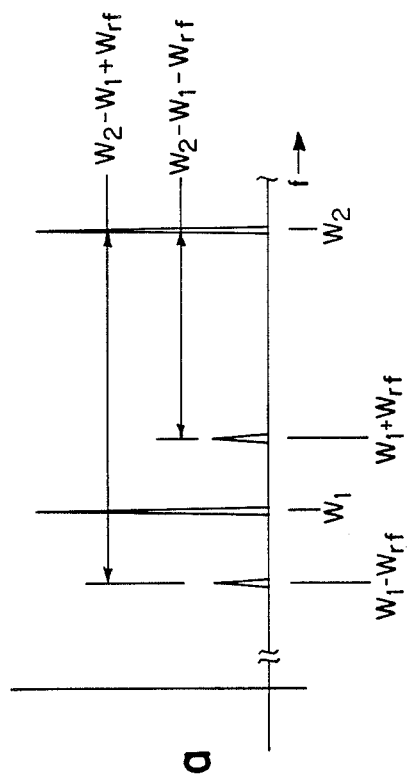
FIG. 28a is a graphical representation of the frequency spectra of the communications system of FIG. 28 and illustrates the manner by which an information signal is generated and coherently detected.

A representative frequency spectrum for the system 900 of FIG. 28 is illustrated in FIG. 28a with the horizontal axis representing frequency and the vertical axis representing relative energy or strength. As shown, the first and second reference carriers are propagated at spaced frequencies $w_1$ and $w_2$, as mentioned above, with the reference carrier $w_1$ propagated along the reference carrier bus 904 and subject to modulation by the modulated RF carrier at the frequency $w_{rf}$ to result in information signals at frequencies $(w_1-w_{rf})$ and $(w_1+w_{rf})$ propagated in the information signal bus 910. When these signals are presented to a receiving coherent detector, they are mixed with the reference carrier energy at the frequency $w_2$ to thus provide information signals at frequencies $(w_2-w_1+w_{rf})$ and $(w_2-w_1-w_{rf})$, these signal outputs being separated by a frequency of $2w_{rf}$. Since the second reference carrier frequency $w_2$ is used to effect coherent detection, rather than the first reference carrier at frequency $w_1$, the need to maintain phase control of the double sideband signals and the reference carrier at frequency $w_2$ is avoided. The frequency spectra of FIG. 28a also illustrates, in a qualitative manner, the relative signal strength between the reference carriers and the information signals, that is, the reference carriers as being relatively stronger when compared to the relatively weaker information signals. This relative signal strength difference is preferred to control the magnitude of cross talk between two or more information signals while allowing effective coherent detection between the relatively stronger reference carriers and the relatively weaker information signals.

A single bus system which also uses plural reference carriers and also uses opposite polarization states is shown in FIG. 29 and designated by the reference character 950. Each terminal device includes an optical circuit 952 coupled to a polarization preserving communications bus 954 through a polarization preserving coupling 956. The communications bus 954 carries both the reference carrier and information signal energy. A coherent detector 958 is coupled to the optical circuit 952 through a polarization selective coupling 960 and optical coupling link 962. A double sideband modulator 964 is placed in the optical circuit 952 and includes a light transmitting modulation channel 966 bounded by electrodes 968 and 970. A modulated RF signal source 972, which includes an input 972a, is connected to the electrodes 968 and 970 for modulating optical energy propagated through the channel 966. Additionally, a polarization converter 974 is placed in the optical circuit for converting optical energy in one polarization state to another, for example, from the horizontal to the vertical state. A reference carrier source 976 introduces a first reference carrier in a first polarization mode (i.e., the horizontal mode) at a first frequency $w_1$ and a second reference carrier in a second polarization mode (i.e, the vertical mode) at a second frequency $w_2$.

At each terminal device, a portion of the horizontally polarized reference carrier energy at frequency $w_1$ and a portion of the vertically polarized reference carrier at frequency $w_2$ is transferred through the polarization preserving coupling 956 into the optical circuit 952. The polarization selective coupling 960 is effective to separate the horizontally polarized reference carriers from the vertically polarized reference and signal carrier energy so as to pass the horizontally polarized reference carrier energy to the modulator 964 while coupling vertical polarized reference carrier and vertically polarized information signal carrier energy onto the optical coupling link 962. The horizontally polarized light then continues onto the modulator 964 for modulation in accordance with the input provided from the modulated RF carrier at input 920a. The modulated energy provided by the modulator 964 is presented to the polarization converter 974 where it is converted to the vertically polarized component and transferred through the lateral coupling 956 into the communications bus 954 for propagation to other terminal devices within the system as a vertical polarized information bearing signal. When operating in a receive mode, the vertically polarized reference carrier at frequency $w_2$ and vertically polarized signal components from the lateral coupling 956' are transferred through the lateral coupling 960' to present the vertically polarized information signal and reference carrier energy directly to the coherent detector 958'.

Horizontally and vertically polarized reference carrier energy at different frequencies may be introduced into the communications bus 956 using the reference carrier generator configurations of FIGS. 30 and 31. Both carriers must be generated from the same source so as to cause the cancellation of laser frequency jitter. As shown in FIG. 30, a reference source configuration, designated generally by the reference character 976 includes a beam splitter 978 which provides a combined beam output along an optical coupling path 980 through a lens 982 to the communications bus 954 (FIG. 29). Optical energy in a first polarization state for example, vertical polarized light is presented through an optical coupling path 984 to the beam splitter 978 for transmission through the optical coupling link 980. In addition, optical energy at another frequency is transferred through the optical coupling path 986 through a half wave plate 988 with the output provided to the beam splitter 978 and the optical coupling link 980.

An alternate arrangement for providing the optical energy to the communications bus 956 is shown in FIG. 31 and designated generally therein by the reference character 990. As shown, the system includes a polarization selective coupling 992 which receives inputs from fibers 994 and fibers 996 and provides the output to the communications bus 954 (FIG. 29). A polarization converter 998 is provided in the optical path 994.

In operation, polarized reference carrier energy at a first wavelength is presented into the optical path 996 to the polarization selective coupling 992 and polarized optical energy at a different frequency is presented to the converter 998 which effects a polarization state conversion and presents the converted state energy through the optical path 994 to the polarization selective coupling with the two outputs provided to the communications bus 956.

The present invention provides a communication system which allows high density wavelength, division multiplexed communications of modulated carriers on an optical bus without the use of a local oscillator at each terminal device and provides optical energy generated at each terminal device that can be used for the development at a modulated carrier for transmission to other terminal devices on the optical bus or for coherent detection of the received modulated carrier including coherent detection by both homodyne and heterodyne techniques. By providing a multiterminal system configuration which equalizes the reference carrier and information signal paths from a reference source to the detector, coherent detection produces a significantly narrowed line width that makes fine-scale frequency division multiplexing possible.

Thus, it will be appreciated from the above, that as a result of the present invention a highly effective optical communications system is provided by which terminal devices are able to effect information signal transmission and homodyne or heterodyne detection of information signals without the use of a local oscillator. It will be equally apparent and as contemplated that modification and/or changes may be made in the illustrated embodiment without departure from the invention. Accordingly, it is expressly intended that the foregoing description and accompanying drawings are illustrative of the preferred embodiment only, not limiting, and that the true spirit and scope of the present invention will be determined by reference to the appended claims.

What is claimed is:

1. An optical communications system comprising:

means defining an optical pathway for propagating light energy;

means including a reference carrier source for introducing light energy onto said optical pathway at a reference wavelength, said reference carrier source consisting essentially of a single, highly frequency stable and accurate optical source for introducing light energy onto said optical pathway for propagation in one direction of travel;

a plurality of terminal devices coupled to said optical pathway and including at least a first terminal device and a second terminal device;

said first terminal device coupled to said optical pathway so as to extract a portion of said light energy at said reference wavelength, said first terminal device including selectively operative means for providing an optical information signal consisting essentially of a part of said extracted portion, said part being frequency shifted at a carrier wavelength coherently related to said reference wavelength, and for introducing said information signal onto said optical pathway;

said second terminal device coupled to said optical pathway so as to extract at least a portion of said light energy at said reference wavelength and at least a portion of said information signal, and said second terminal device including selectively operative means for detecting the information in said information signal by utilizing an optical signal consisting essentially of said extracted portion of both said reference wavelength and said information signal; and said optical pathway including means for providing substantially equal propagation times for transmisison of both said reference wavelength and said information signal between said first and second terminal devices to provide coherence between said reference wavelength and said information signal.

2. The system of claim 1 wherein said reference wavelength is transmitted along one path between said terminal devices and said information signal is transmitted along another path between said terminal devices.

3. The system of claim 1 wherein said first terminal device also includes means for coherently detecting information carried by an information signal propagated on said optical pathway from a second terminal device by utilizing said reference wavelength and the received information signal.

4. The system of claim 1 wherein each of said first and second terminal devices includes both means for generating an information signal for introduction to said optical pathway and means for coherently detecting the information of an information signal propagated on said pathway, and said system includes means for providing substantially equal propagation times between respective terminal devices for said reference wavelength and said information signals.

5. The system of claim 1 including at least several of said terminal devices, and each of said terminal devices are coupled to said pathway to remove a small percentage of the optical energy introduced therein at said reference wavelength whereby sufficient energy at said reference wavelength passes by each terminal device so that at least a portion of said energy at said reference wavelength is available to all of said terminal devices for use as a reference signal or information carrier signal.

6. The system of claim 1 wherein said means for providing an optical information signal includes selectively operative means for shifting the wavelength of at least a part of the extracted portion of said light energy, and modulating said wavelength shifted energy to form said information signal.

7. The system of claim 1 wherein said means for detecting the information effects heterodyne detection of the information signal by removing a portion of the light energy propagated in said optical pathway at the reference wavelength, shifting the wavelength of the removed light energy to a wavelength offset by a reference amount from that of the information signal, and combining the wavelength shifted energy and the information signal to create an intermediate frequency information signal.

8. The system of claim 1 wherein said means for detecting the information effects homodyne detection of the information by removing a portion of the light energy propagated in said optical pathway at the reference wavelength, shifting the wavelength of the removed light energy to a wavelength substantially equal to that of the information signal, and combining the wavelength shifted energy with the information signal to effect detection.

9. The system of claim 1 wherein said second-mentioned means introduces light energy onto said optical pathway at a plurality of reference wavelengths.

10. The system of claim 9, wherein said means for detection effects heterodyne detection of an information signal by removing a portion of the light energy propagated in said optical pathway at a selected one of the plurality of reference wavelengths, shifting the wavelength of the removed light energy to a wavelength offset by a reference amount from that of the information signal, and combining the wavelength shifted energy and the information signal to create an intermediate frequency information signal.

11. The system of claim 9 wherein said means for detection effects homodyne detection of an information signal by removing a portion of the light energy propagated in said optical pathway at a selected one of the plurality of reference wavelengths, shifting the wavelength of the removed light energy to a wavelength substantially equal to that of the information signal, and combining the wavelength shifted energy with the information signal to effect detection.

12. An optical communications system comprising:
means defining an optical pathway for propagating light energy;
means for introducing light energy onto said optical pathway at a reference wavelength;
at least a first terminal device coupled to said optical pathway so as to extract a portion of said light energy at said reference wavelength, said first terminal device including selectively operative means for providing an optical information signal from said extracted portion at a carrier wavelength coherently related to said reference wavelength, and for introducing said information signal onto said optical pathway;
at least a second terminal device coupled to said optical pathway so as to extract at least a portion of said light energy at said reference wavelength and at least a portion of said information signal, and said second terminal device including selectively operative means for detecting the information in said information signal by utilizing said extracted portion of both said reference wavelength and said information signal; and
said optical pathway including means for providing substantially equal propagation times for transmission of both said reference wavelength and said information signal between said first and second terminal devices to provide coherence between said reference wavelength and said information signal, wherein each of said first and second terminal devices include both means for generating an information signal for introducing to said optical pathway and means for coherently detecting the information of an information signal propagated on said pathway, and said system includes means for providing substantially equal propagation times between respective terminal devices for said reference wavelength and said information signals, and
wherein said means for introducing light energy into said pathway includes means for introducing a first reference wavelength traveling in one direction in said pathway and a second reference wavelength traveling in an opposite direction in said pathway, said first and second terminal devices being coupled to said optical pathway to extract a portion of the energy of each of said reference wavelengths, and each of said first and second terminal devices including means for providing an optical information signal from the one of said reference wavelengths traveling toward the other of said terminal devices, and means for coherently detecting an information signal provided by the other of said terminal devices from the reference wavelength which travels from said other terminal device toward said one terminal device.

13. An optical communications system comprising:
means defining an optical pathway for propagating light energy;
means for introducing light energy onto said optical pathway at a reference wavelength;
at least a first terminal device coupled to said optical pathway so as to extract a portion of said light energy at said reference wavelength, said first terminal device including selectively operative means for providing an optical information signal from said extracted portion at a carrier wavelength coherently related to said reference wavelength, and for introducing said information signal onto said optical pathway;
at least a second terminal device coupled to said optical pathway so as to extract at least a portion of said light energy at said reference wavelength and at least a portion of said information signal, and said second terminal device including selectively operative means for detecting the information in said information signal by utilizing said extracted portion of both said reference wavelength and said information signal; and said optical pathway including means for providing substantially equal propagation times for transmission of both said reference wavelength and said information signal between said first and second terminal devices to provide coherence between said reference wavelength and said information signal, wherein said optical pathway is an optical waveguide configured for propagating light energy in first and second polarization modes and said first terminal device removes a portion of the light energy at one of said polarization modes, modulates and polarization shifts the removed light energy and introduces said modulated and polarization shifted signal at the other of said polarization modes as an information signal.

14. An optical communications system comprising:
means defining an optical pathway for propagating light energy;
means for introducing light energy onto said optical pathway at a reference wavelength;
at least a first terminal device coupled to said optical pathway so as to extract a portion of said light energy at said reference wavelength, said first terminal device including selectively operative means for providing an optical information signal from said extracted portion at a carrier wavelength coherently related to said reference wavelength, and for introducing said information signal onto said optical pathway;
at least a second terminal coupled to said optical pathway so as to extract at least a portion of said light energy at said reference wavelength and at least a portion of said information signal, and said second terminal device including selectively operative means for detecting the information in said information signal by utilizing said extracted portion of both said reference wavelength and said information signal; and
said optical pathway including means for providing substantially equal propagation times for transmission of both said reference wavelength and said information signal between said first and second terminal devices to provide coherence between said reference wavelength and said information signal, wherein said optical pathway means comprises a first optical bus for propagating light energy introduced at said reference wavelength and a second optical bus for propagating said information signal.

15. An optical communications system comprising:
means defining an optical pathway for propagating light energy;
means for introducing light energy onto said optical pathway at a reference wavelength;
at least a first terminal device coupled to said optical pathway so as to extract a portion of said light energy at said reference wavelength, said first terminal device including selectively operative means for providing an optical information signal from said extracted portion at a carrier wavelength coherently related to said reference wavelength, and for introducing said information signal onto said optical pathway;
at least a second terminal device coupled to said optical pathway so as to extract at least a portion of said light energy at said reference wavelength and at least a portion of said information signal, and said second terminal device including selectively operative means for detecting the information in said information signal by utilizing said extracted portion of both said reference wavelength and said information signal; and
said optical pathway including means for providing substantially equal propagation times for transmission of both said reference wavelength and said information signal between said first and second terminal devices to provide coherence between said reference wavelength and said information signal, wherein said means for providing an optical information signal includes means for providing a double sideband signal, and means for optically filtering said signal to provide a single sideband signal.

16. The system of claim 15 wherein said means for filtering said signal couples said terminal device to said pathway for introducing said information signal thereon and includes an optical resonant cavity configured for transmitting only one of said sidebands.

17. An optical communications system comprising:
means defining an optical pathway for propagating light energy;
means for introducing light energy onto said optical pathway at a reference wavelength;
at least a first terminal device coupled to said optical pathway so as to extract a portion of said light energy at said reference wavelength, said first terminal device including selectively operative means for providing an optical information signal from said extracted portion at a carrier wavelength coherently related to said reference wavelength, and for introducing said information signal onto said optical pathway;
at least a second terminal device coupled to said optical pathway so as to extract at least a portion of said light energy at said reference wavelength and at least a portion of said information signal, and said second terminal device including selectively operative means for detecting the information in said information signal by utilizing said extracted portion of both said reference wavelength and said information signal; and
said optical pathway including means for providing substantially equal propagation times for transmission of both said reference wavelength and said information signal between said first and second terminal devices to provide coherence between said reference wavelength and said information signal, wherein said reference wavelength and said information are transmitted at least in part along different paths between said terminal devices, and said means for providing substantially equal propagation times includes providing substantially equal path lengths between said terminal devices for said different paths.

18. The system of claim 17 further including means for thermally varying portions of at least one of said different paths for maintaining said substantially equal path lengths.

19. An optical communications system comprising:
means defining an optical pathway for propagating light energy;
means for introducing light energy onto said optical pathway at a reference wavelength;

at least a first terminal device coupled to said optical pathway so as to extract a portion of said light energy at said reference wavelength, said first terminal device including selectively operative means for providing an optical information signal from said extracted portion at a carrier wavelength coherently related to said reference wavelength, and for introducing said information signal onto said optical pathway;

at least a second terminal device coupled to said optical pathway so as to extract at least a portion of said light energy at said reference wavelength and at least a portion of said information signal, and said second terminal device including selectively operative means for detecting the information in said information signal by utilizing said extracted portion of both said reference wavelength and said information signal; and said optical pathway including means for providing substantially equal propagation times for transmission of both said reference wavelength and said information signal between said first and second terminal devices to provide coherence between said reference wavelength and said information signal, wherein said means for providing an information signal includes means for creating a phase modulated information signal, and said means for providing substantially equal propagation times includes means for maintaining the phase relationship from said first to said second device between said reference wavelength and optical information signal.

20. An optical communications system comprising:
means defining an optical pathway for propagating light energy;

means including a reference carrier source for introducing light energy onto said optical pathway at first and second reference wavelengths, said reference carrier source consisting essentially of a single, highly frequency stable and accurate optical source for introducing light energy onto said optical pathway for propagation in one direction of travel;

a plurality of terminal devices coupled to said optical pathway and including said first terminal device and a second terminal device;

said first terminal device coupled to said optical pathway so as to extract a portion of said light energy at said first reference wavelength, said first terminal device including selectively operative means for modulating the extracted portion of said first reference wavelength to provide an optical information signal consisting essentially of a modulated part of said extracted portion and being carried on said first reference wavelength, and for introducing said information signal onto said optical pathway;

said second terminal device coupled to said optical pathway so as to extract at least a portion of said light energy at said second reference wavelength and said information signal, and said second terminal device including selectively operative means for coherently detecting the information in said information signal by utilizing an optical signal consisting essentially of the extracted portions of both said second reference wavelength and said information signal; and said optical pathway including means for providing substantially equal propagation times for transmission of both said second reference wavelength and said information signal between said first and second terminal devices to provide coherence between said reference wavelength and said information signal.

21. The system of claim 20 wherein said first terminal device also includes means for coherently detecting information carried by an information signal propagated on said optical pathway from a second terminal device by utilizing one of said reference wavelength and the received information signal.

22. The system of claim 21 wherein each of said first and second terminal devices include both means for generating an information signal for introduction to said optical pathway and means for coherently detecting the information of an information signal propagated on said pathway, and said system includes means for providing substantially equal propagation times between respective terminal devices for said reference wavelength and said information signals.

23. An optical communications system comprising:
means defining an optical pathway for propagating light energy;

means for introducing light energy onto said optical pathway at first and second reference wavelengths;

at least a first terminal device coupled to said optical pathway so as to extract a portion of said light energy at said first reference wavelength, said first terminal device including selectively operative means for modulating the extracted portion of said first reference wavelength to provide an optical information signal carried on said first reference wavelength, and for introducing said information signal onto said optical pathway;

at least a second terminal device coupled to said optical pathway so as to extract at least a portion of said light energy at said second reference wavelength and said information signal, and said second terminal device including selectively operative means for coherently detecting the information in said information signal by utilizing both said second reference wavelength and said information signal; and said optical pathway including means for providing substantially equal propagation times for transmission of both said second reference wavelength and said information signal between said first and second terminal devices to provide coherence between said reference wavelength and said information signal, wherein said second reference wavelength is transmitted along one path between said terminals and said first reference wavelength and said information signal are transmitted along another path between said terminals.

24. An optical communication system comprising:
an optical pathway for propagating optical energy;

means including a reference carrier source for introducing light energy onto said optical pathway at a reference wavelength for propagation therein, said reference carrier source consisting essentially of a single, highly frequency stable and accurate optical source for introducing light energy onto said optical pathway for propagation in one direction of travel;

a plurality of terminal devices coupled to said optical pathway for communcations with one another, each terminal device comprising means for generating an information signal by removing a portion of the reference wavelength light energy, for frequency shifting and modulating at least a part of the removed reference wavelength energy for introduction onto said optical pathway as an information signal consisting essentially of a frequency shifted and modulated part of said removed portion and means for detecting an information signal by removing a portion of the reference wavelength light energy and the information signal and by using a combined optical signal consisting essentially of the removed portions of the reference wavelength light energy and the information signal in a detector; and said optical pathway including means for providing substantially equal propagation times for transmission of both said reference wavelength and said information signal between said terminal devices to provide coherence between said reference wavelength and said information signal at said means for detecting so as to provide coherent detection of said signal.

25. The system of claim 24 wherein said means for detecting includes means for frequency shifting said removed portion of said reference wavelength for combination with said information signal.

26. The system of claim 25 wherein said means for introducing light energy introduces light energy onto said optical pathway at a plurality of reference wavelengths.

27. The system of claim 26 wherein each of said terminal devices further comprises tunable band pass filter means for passing a selected one of the plural reference wavelengths.

28. The system of claim 27 wherein said tunable band pass filter means comprises a resonant loop coupled to said optical pathway and thermal controller means for thermally altering the resonant characteristics of said resonant loop.

29. The system of claim 26 wherein said tunable band pass filter means comprises a tunable resonant cavity means having a bandwidth sufficient to pass a selected one of the plural reference wavelengths.

30. The system of claim 24 wherein said means for modulating comprises an acousto-optic cell.

31. An optical communication system comprising:
an optical pathway for propagating optical energy;
means for introducing light energy onto said optical pathway at a reference wavelength for propagation therein;
at least two terminal devices coupled to said optical pathway for communications with one another, each terminal device comprising means for generating an information signal by removing a portion of the reference wavelength light energy, for frequency shifting and modulating the removed reference wavelength energy for introduction onto said optical pathway as an information signal and means for detecting an information signal by removing a portion of the reference wavelength light energy and the information signal and combining the removed energy in a detector, wherein said means for detecting includes means for frequency shifting said removed portion of said reference wavelength for combination with said information signal; and
said optical pathway including means for providing substantially equal propagation times for transmission of both said reference wavelength and said information signal between said terminal devices to provide coherence between said reference wavelength and said information signal at said means for detecting so as to provide coherent detection of said signal, wherein said means for generating includes means for providing a double side band signal, and said system further includes a pass band filter means comprising a tunable resonant cavity having a bandwidth sufficient to pass a single sideband of the information signal.

32. The system of claim 31 wherein said tunable resonant cavity comprises a resonant loop coupled to said optical pathway and thermal controller means for thermally altering the resonant characteristics of said resonant loop.

33. An optical communication system comprising:
an optical pathway for propagating optical energy;
means for introducing light energy onto said optical pathway at a reference wavelength for propagation therein;
at least two terminal devices coupled to said optical pathway for communications with one another, each terminal device comprising means for generating an information signal by removing a portion of the reference wavelength light energy, for frequency shifting and modulating the removed reference wavelength energy for introduction onto said optical pathway as an information signal and means for detecting an information signal by removing a portion of the reference wavelength light energy and the information signal and combining the removed energy in a detector; and
said optical pathway including means for providing substantially equal propagation times for transmission of both said reference wavelength and said information signal between said terminal devices to provide coherence between said reference wavelength and said information signal at said means for detecting so as to provide coherent detection of said signal, wherein said optical pathway further comprises a first optical waveguide for propagating light energy at the reference wavelength and a second optical waveguide for propagating said information signal; said information signal generating means further comprises means for creating a single sideband information signal and further includes pass band filter means for passing a single sideband between said terminal device and said second fiber; said pass band filter means comprising a tunable resonant cavity means having a bandwidth sufficient to pass a single sideband of an information signal; and said tunable resonant cavity means comprises a resonant loop coupled to said second optical waveguide and thermal controller means for thermally altering the resonant characteristics of said resonant loop.

34. An optical communications system comprising:
means defining an optical pathway for propagating light energy in first and second polarization modes;
means for introducing light energy at first and second frequencies in first and second respective polarization modes onto said optical pathway; and
at least one terminal device means coupled to said optical pathway for generating an information signal, said one terminal device including means for removing a portion of the light energy in the first polarization mode and effecting both modulation and a polarization mode shift of the removed energy to the second polarization mode and reintroducing the modulated and polarization mode-shifted energy onto the optical pathway as an information signal.

35. The system of claim 34 further comprising means for removing from said optical pathway a portion of the light energy propagated at said second frequency and a portion of the light energy of the information signal and effecting coherent detection of the information in said information signal using a portion of the light energy at said second frequency.

36. A method of communication by optical energy, comprising the steps of:
   defining an optical pathway for propagating light energy;
   introducing optical carrier energy at a reference wavelength onto the optical pathway by using means including a reference carrier source, said reference carrier source consisting essentially of a single, highly frequency stable and accurate optical source for introducing light energy onto the optical pathway for propagation in one direction of travel;
   introducing an optical information signal consisting essentially of a frequency shifted and modulated part of a removed portion of said energy at said reference wavelength onto the optical pathway at a carrier wavelength coherently related to said reference wavelength; and
   detecting the information in the information signal propagated on the optical pathway by removing a portion of the energy of the information signal and the energy propagated at the reference wavelength, shifting the wavelength of the removed reference energy to a shifted wavelength, and using an optical signal consisting essentially of the removed portion of the information signal and the shifted wavelength energy to effect detection.

37. A method of communication by optical energy, comprising the steps of:
   defining an optical pathway for propagating light energy;
   introducing optical carrier energy at a reference wavelength onto said optical pathway by using means including a reference carrier source, said reference carrier source consisting essentially of a single, highly frequency stable and accurate optical source for introducing light energy onto the optical pathway for propagation in one direction of travel;
   extracting a portion of the reference wavelength from said pathway;
   providing an information signal consisting essentially of the extracted energy at a carrier wavelength at least coherently related thereto and introducing said information signal onto the optical pathway;
   detecting the information in the information signal propagated on the optical pathway by removing a portion of the energy of the information signal and of the energy propagated at the reference wavelength, shifting the wavelength of the removed reference energy to a shifted wavelength, and using an optical signal consisting essentially of the removed portion of the information signal and the shifted wavelength energy to effect detection; and
   maintaining the propagation times of said reference wavelength and said information signal substantially equal in their paths between said providing of said information signal and said detection of said information so as to provide coherent detection.

38. The method of claim 37 wherein said defining step includes defining one optical path for transmission of said reference wavelength and another optical path for transmission of said information signal.

39. The method of claim 37 wherein the detecting step further comprises shifting the reference wavelength of the removed energy to a wavelength substantially equal to that of the information signal to effect homodyne detection.

40. The method of claim 37 wherein the detecting step further comprises shifting the reference wavelength of the removed energy to a wavelength offset from that of the information signal by a reference amount to effect heterodyne detection.

41. The method of claim 37 wherein the first-mentioned introducing step further comprises the introduction of plural optical carriers at respective reference wavelengths onto the optical pathway and the detection step comprises detecting the information signal propagated on the optical pathway by removing a portion of the energy of a selected one of the plural carriers.

42. A method of communication by optical energy, comprising the steps of:
   defining an optical pathway for propagating light energy;
   introducing optical carrier energy at a reference wavelength onto said optical pathway;
   extracting a portion of the reference wavelength from said pathway;
   providing an information signal from the extracted energy at a carrier wavelength at least coherently related thereto and introducing said information signal onto the optical pathway;
   detecting the information in the information signal propagated on the optical pathway by removing a portion of the energy of the information signal and of the energy propagated at the reference wavelength, shifting the wavelength of the removed reference energy to a shifted wavelength, and mixing the information signal and the shifted wavelength energy to effect detection; and
   maintaining the propagation times of said reference wavelength and said information signal substantially equal in their paths between said providing of said information signal and said detection of said information so as to provide coherent detection, wherein the defining step further comprises the step of defining the optical pathway as a first and second optical bus, the first-mentioned introducing step introducing optical carrier energy onto the first optical bus, and the second-mentioned introducing step introducing the information signal onto the second bus.

43. An optical communications system comprising:
   means defining an optical pathway for propagating light energy;
   means including a reference carrier source for introducing light energy onto said optical pathway at a reference wavelength, said reference carrier source consisting essentially of a single, highly frequency stable and accurate optical source for introducing light energy onto said optical pathway for propagation in one direction of travel; and,
   a plurality of terminal devices coupled to said optical pathway, each of said terminal devices consisting essentially of means for extracting a portion of said light energy at said reference wavelength from said optical pathway, means for selectively modulating and frequency shifting a part of said extracted portion to produce a first information signal, means for introducing said first information signal onto said optical pathway, means for extracting a portion of a second information signal from said optical pathway, means for combining said extracted portion of said second information signal with a part of said extracted portion of said light energy at said reference wavelength to form a combined optical signal, and means for coherently detecting the information within said combined optical signal.

* * * * *